US012660005B2

(12) United States Patent
Kang et al.

(10) Patent No.: US 12,660,005 B2
(45) Date of Patent: Jun. 16, 2026

(54) MULTI-LINK OPERATION (MLO) TRANSMISSION METHOD AND APPARATUS THEREOF

(71) Applicant: MEDIATEK INC., Hsinchu City (TW)

(72) Inventors: Hao-Hua Kang, Hsinchu City (TW);
Chih-Chun Kuo, Hsinchu City (TW);
Cheng-Ying Wu, Hsinchu City (TW);
Yang-Hung Peng, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 309 days.

(21) Appl. No.: 18/388,271

(22) Filed: Nov. 9, 2023

(65) Prior Publication Data

US 2024/0163932 A1     May 16, 2024

Related U.S. Application Data

(60) Provisional application No. 63/479,558, filed on Jan. 12, 2023, provisional application No. 63/383,116, filed on Nov. 10, 2022.

(51) Int. Cl.
*H04W 74/0833*     (2024.01)
*H04W 74/08*     (2024.01)

(52) U.S. Cl.
CPC ..... *H04W 74/085* (2013.01); *H04W 74/0891* (2013.01)

(58) Field of Classification Search
CPC ........................ H04W 74/085; H04W 74/0891
See application file for complete search history.

(56) References Cited

U.S. PATENT DOCUMENTS

2021/0315025 A1*  10/2021  Seok ................. H04W 74/0808
2022/0029736 A1    1/2022  Chu

FOREIGN PATENT DOCUMENTS

CN          110972256 A      4/2020

* cited by examiner

*Primary Examiner* — Elton Williams
(74) *Attorney, Agent, or Firm* — McClure, Qualey & Rodack, LLP

(57)     ABSTRACT

A multi-link operation (MLO) transmission method is provided. The MLO transmission method may be applied to an apparatus. The MLO transmission method may include the following steps. A plurality of station (STA) modules of the apparatus may each perform a respective backoff procedure. Each STA module may correspond to a different link. An MLO control circuit of the apparatus or a first STA module of the plurality of STA modules may determine whether to perform a synchronous transmission (TX) for a first STA module and at least one of other STA modules in response to a first backoff counter of the first STA module reaching 0.

17 Claims, 22 Drawing Sheets

700

100

800

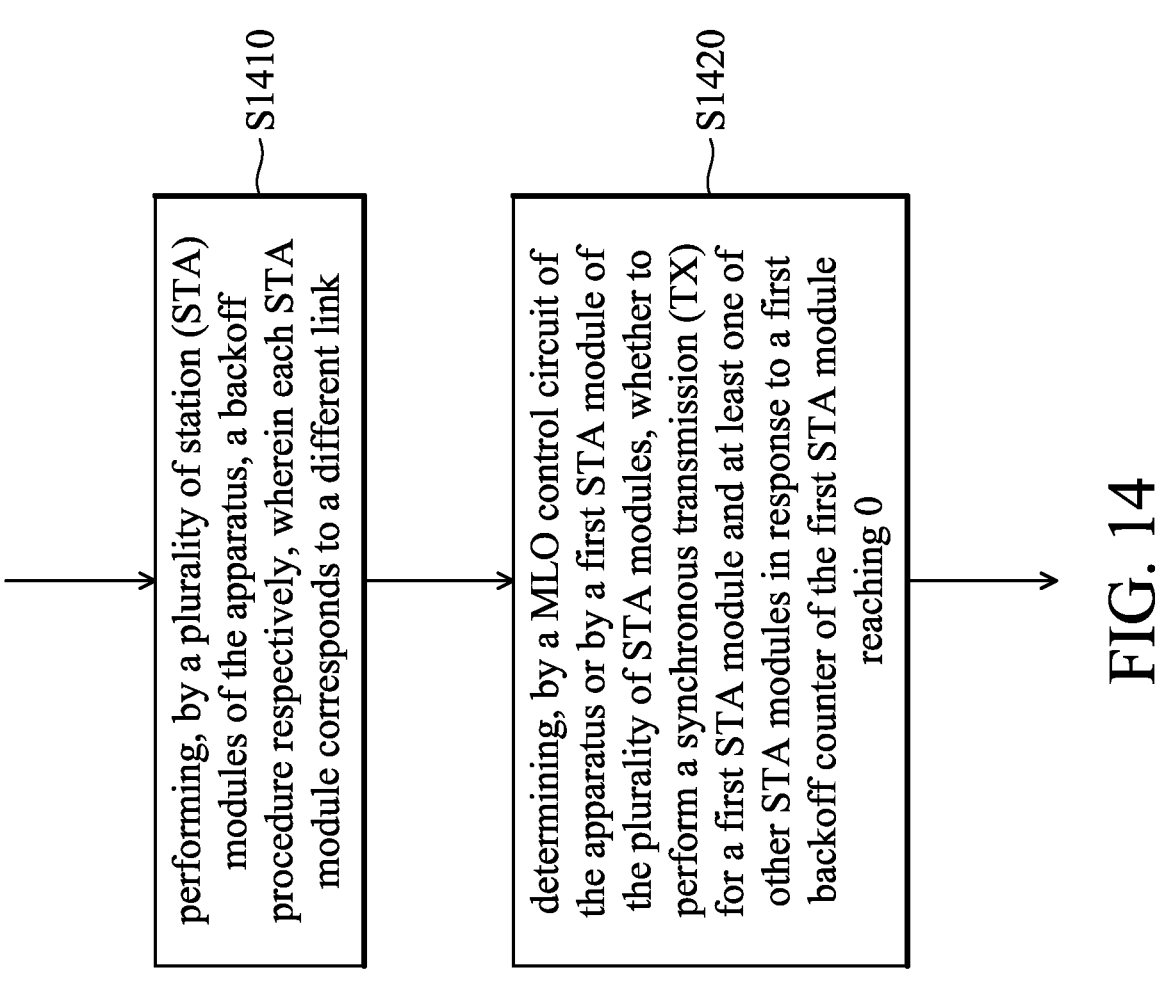

1400 performing, by a plurality of station (STA) modules of the apparatus, a backoff procedure respectively, wherein each STA module corresponds to a different link ⁓S1410 determining, by a MLO control circuit of the apparatus or by a first STA module of the plurality of STA modules, whether to perform a synchronous transmission (TX) for a first STA module and at least one of other STA modules in response to a first backoff counter of the first STA module reaching 0 ⁓S1420

FIG. 14

MULTI-LINK OPERATION (MLO) TRANSMISSION METHOD AND APPARATUS THEREOF

CROSS REFERENCE TO RELATED APPLICATIONS

This application claims the benefits of U.S. Provisional Application No. 63/383,116 filed on Nov. 10, 2022, and U.S. Provisional Application No. 63/479,558 filed on Jan. 12, 2023, the entirety of which is incorporated by reference herein.

BACKGROUND OF THE INVENTION

Field of the Invention

The invention generally relates to wireless communications technology, and more particularly, to multi-link operation (MLO) transmission.

Description of the Related Art

As demand for ubiquitous computing and networking has grown, various wireless technologies have been developed, including Wireless-Fidelity (Wi-Fi) which is a Wireless Local Area Network (WLAN) technology allowing communication devices (such as access point (AP), a smartphone, a smart pad, a laptop computer, a portable multimedia player, an embedded apparatus, or the like) to obtain wireless services in a frequency band of 2.4 GHz, 5 GHz, 6 Gz or 60 GHz.

In the multi-link operation (MLO) technology, a multi-link device (MLD) may be a logical entity that is capable of supporting more than one affiliated station (STA) and can operate using one or more affiliated STAs, and that presents one medium access control (MAC) data service and a single MAC service access point (SAP) to the logical link control (LLC) sublayer.

In addition, in the MLO technology, the synchronous transmission (TX) operations are defined in 802.11be standard. That is, for the STAs on links of any non-simultaneous transmission and reception (NSTR) link pair, the STAs should begin TX simultaneously to avoid in-device interference. However, in the current standard, the details of how to perform the operations for the STAs on links of any NSTR link pair are not specified as implementation dependent.

Therefore, how to more efficiently and flexibly perform the operations for the STAs on the links of any NSTR link pair is a topic that is worthy of discussion.

BRIEF SUMMARY OF THE INVENTION

Multi-link operation (MLO) transmission methods and apparatuses for MLO transmission are provided to overcome the problems mentioned above.

An embodiment of the invention provides a multi-link operation (MLO) transmission method. The MLO transmission method may be applied to an apparatus. The MLO transmission method may include the following steps. A plurality of station (STA) modules of the apparatus may each perform a respective backoff procedure. Each STA module may correspond to a different link. An MLO control circuit of the apparatus or the first STA module of the plurality of STA modules may determine whether to perform a synchronous transmission (TX) for the first STA module and at least one of the other STA modules in response to the first backoff counter of the first STA module reaching 0.

An embodiment of the invention provides an apparatus for multi-link operation (MLO) transmission. The apparatus may include a transceiver, a Wi-Fi chip and a processor. The transceiver may be configured to perform wireless transmission and reception to and from an access point (AP). The Wi-Fi chip may comprises a plurality of station (STA) modules and an MLO control circuit, wherein each STA module corresponds to a different link. The processor may be coupled to the transceiver and the Wi-Fi chip. The processor may controls the Wi-Fi chip to use each STA module to perform a respective backoff procedure, and use the MLO control circuit to determine whether to perform a synchronous transmission (TX) for the first STA module and at least one of the other STA modules in response to the first backoff counter of the first STA module reaching 0.

An embodiment of the invention provides an apparatus for multi-link operation (MLO) transmission. The apparatus may include a transceiver, a Wi-Fi chip and a processor. The transceiver may be configured to perform wireless transmission and reception to and from an access point (AP). The Wi-Fi chip may comprises a plurality of station (STA) modules and an MLO control circuit, wherein each STA module corresponds to a different link. The processor may be coupled to the transceiver and the Wi-Fi chip. The processor may controls the Wi-Fi chip to use each STA module to perform a respective backoff procedure, and use the first STA module of the plurality of STA modules to determine whether to perform a synchronous transmission (TX) for the first STA module and at least one of the other STA modules in response to the first backoff counter of the first STA module reaching 0.

Other aspects and features of the invention will become apparent to those with ordinary skill in the art upon review of the following descriptions of specific embodiments of the MLO transmission methods and apparatuses for MLO transmission.

BRIEF DESCRIPTION OF THE DRAWINGS

The invention will become more fully understood by referring to the following detailed description with reference to the accompanying drawings, wherein:

FIG. 14 is a flow chart illustrating an MLO transmission method according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
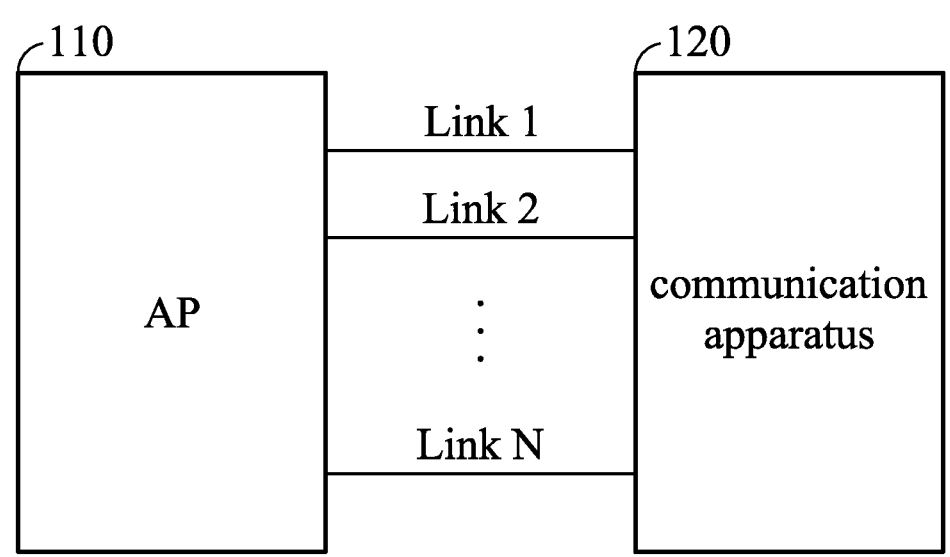
FIG. 1 is a block diagram of a wireless communication system 100 according to an embodiment of the application.

FIG. 1 is a block diagram of a wireless communication system 100 according to an embodiment of the application. As shown in FIG. 1, the wireless communication system 100 may include an Access Point (AP) 110 and a communication apparatus 120. In the embodiments of the invention, the AP 110 and the communication apparatus 120 may be the multi-link devices (MLDs), i.e., the AP 110 may be an AP MLD and the communication apparatus 120 may be a station (STA) MLD. The AP 110 may perform multi-link operation (MLO) with the communication apparatus 120 through multiple wireless links Link 1, Link 2 . . . Link N. The AP 110 is an entity compatible with the Institute of Electrical and Electronics Engineers (IEEE) 802.11 standards to provide and manage the access to the wireless medium for the communication apparatus 120. It should be noted that, in order to clarify the concept of the invention, FIG. 1 presents a simplified block diagram in which only the elements relevant to the invention are shown. However, the invention should not be limited to what is shown in FIG. 1.

In an embodiment of the invention, the AP 110 may be an Extremely High Throughput (EHT) AP which is compatible with the IEEE 802.11be standards. In another embodiment of the invention, the AP 110 may be an AP which is compatible with any IEEE 802.11 standards later than 802.11be.

In an embodiment of the invention, the communication apparatus 120 may be an STA MLD, a non-AP STA, a mobile phone (e.g., feature phone or smartphone), a panel Personal Computer (PC), a laptop computer, or any computing device, as long as it is compatible with the same IEEE 802.11 standards as the AP 110. The communication apparatus 120 may associate and communicate with the AP 110 to send or receive data in an uplink (UL) or downlink (DL) Multi-User-Physical layer Protocol Data Unit (MU-PPDU). The MU-PPDU may be a resource-unit Orthogonal Frequency Division Multiple Access (RU-OFDMA), a MU-Multiple Input-Multiple-Output (MU-MIMO) PPDU, or an aggregated PPDU.

Figure 2:
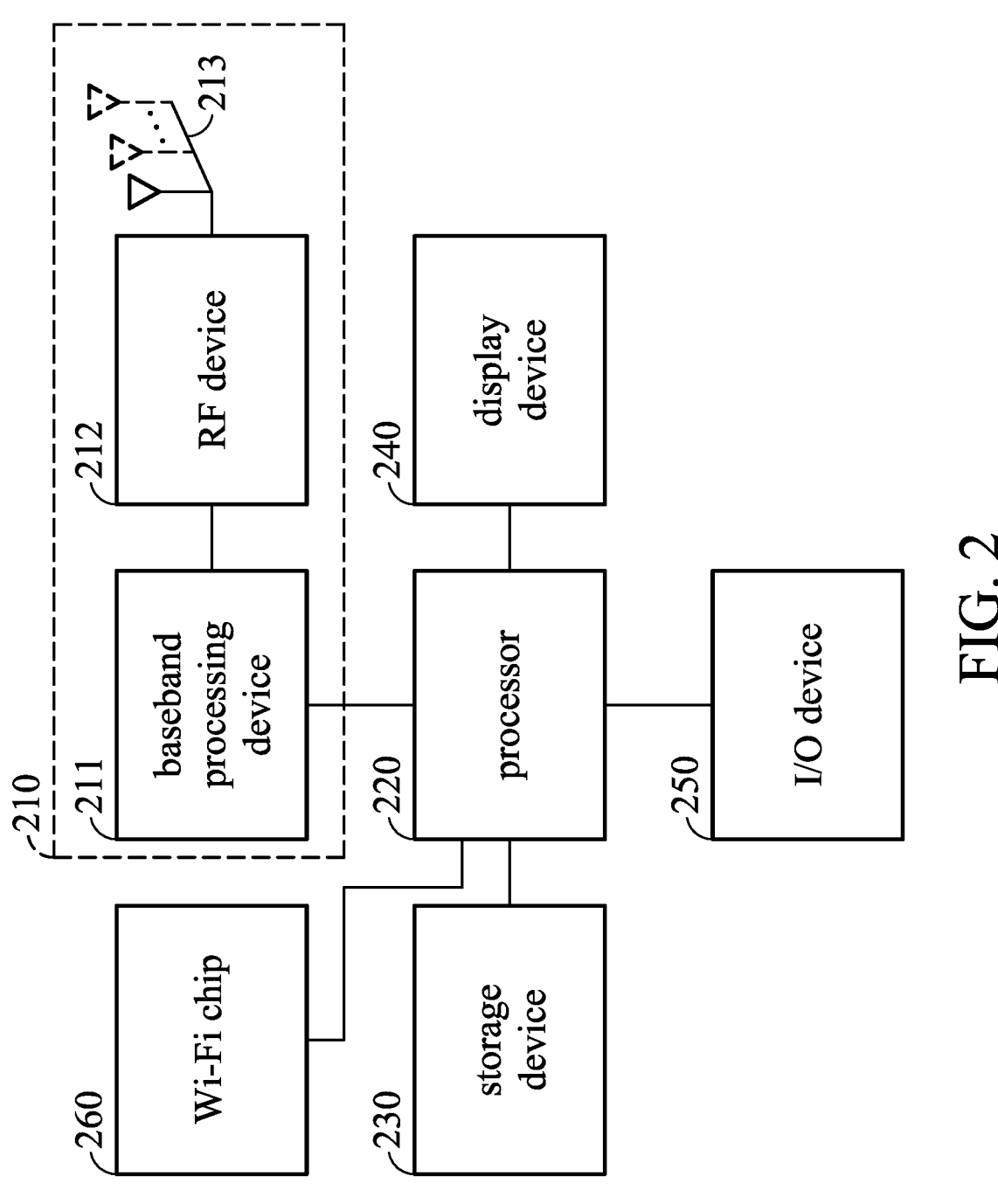
FIG. 2 is a block diagram illustrating a communication apparatus according to an embodiment of the application.

FIG. 2 is a block diagram illustrating a communication apparatus according to an embodiment of the application. The communication apparatus 200 can be applied to the communication apparatus 120. As shown in FIG. 2, the communication apparatus 200 may include a wireless transceiver 210, a processor 220, a storage device 230, a display device 240, an Input/Output (I/O) device 250, and a Wi-Fi chip 260.

The wireless transceiver 210 may be configured to perform wireless transmission and reception to and from the AP 110.

Specifically, the wireless transceiver 210 may include a baseband processing device 211, a Radio Frequency (RF) device 212, and antenna 213, wherein the antenna 213 may include an antenna array for UL/DL MIMO.

The baseband processing device 211 may be configured to perform baseband signal processing, such as Analog-to-Digital Conversion (ADC)/Digital-to-Analog Conversion (DAC), gain adjusting, modulation/demodulation, encoding/decoding, and so on. The baseband processing device 211 may contain multiple hardware components, such as a baseband processor, to perform the baseband signal processing.

The RF device 212 may receive RF wireless signals via the antenna 213, convert the received RF wireless signals to baseband signals, which are processed by the baseband processing device 211, or receive baseband signals from the baseband processing device 211 and convert the received baseband signals to RF wireless signals, which are later transmitted via the antenna 213. The RF device 212 may also contain multiple hardware devices to perform radio frequency conversion. For example, the RF device 212 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 220 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 210 for wireless communications with the AP 110, storing and retrieving data (e.g., program code) to and from the storage device 230, sending a series of frame data (e.g. representing text messages, graphics, images, etc.) to the display device 240, and receiving user inputs or outputting signals via the I/O device 250.

In particular, the processor 220 coordinates the aforementioned operations of the wireless transceiver 210, the storage device 230, the display device 240, the I/O device 250, and the Wi-Fi chip 260 for performing the method of the present application.

In another embodiment, the processor 220 may be incorporated into the baseband processing device 211, to serve as a baseband processor.

As will be appreciated by persons skilled in the art, the circuits of the processor 220 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 230 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 240 may be a Liquid-Crystal Display (LCD), a Light-Emitting Diode (LED) display, an Organic LED (OLED) display, or an Electronic Paper Display (EPD), etc., for providing a display function. Alternatively, the display device 240 may further include one or more touch sensors for sensing touches, contacts, or approximations of objects, such as fingers or styluses.

The I/O device 250 may include one or more buttons, a keyboard, a mouse, a touch pad, a video camera, a microphone, and/or a speaker, etc., to serve as the Man-Machine Interface (MMI) for interaction with users.

According to an embodiment of the invention, the Wi-Fi chip 260 may be configured to perform the operations of Wi-Fi communications. Details of the architecture of the Wi-Fi chip are discussed below via FIG. 4 and FIG. 9. In another embodiment of the invention, the wireless transceiver 210 may be also combined with the Wi-Fi chip 260 to form a Wi-Fi chip.

It should be understood that the components described in the embodiment of FIG. 2 are for illustrative purposes only and are not intended to limit the scope of the application. For example, a communication apparatus may include more components, such as another wireless transceiver for providing telecommunication services, a Global Positioning System (GPS) device for use of some location-based services or applications, and/or a battery for powering the other components of the communication apparatus, etc. Alternatively, a communication apparatus may include fewer components. For example, the communication apparatus may not include the display device 240 and/or the I/O device 250.

Figure 3:
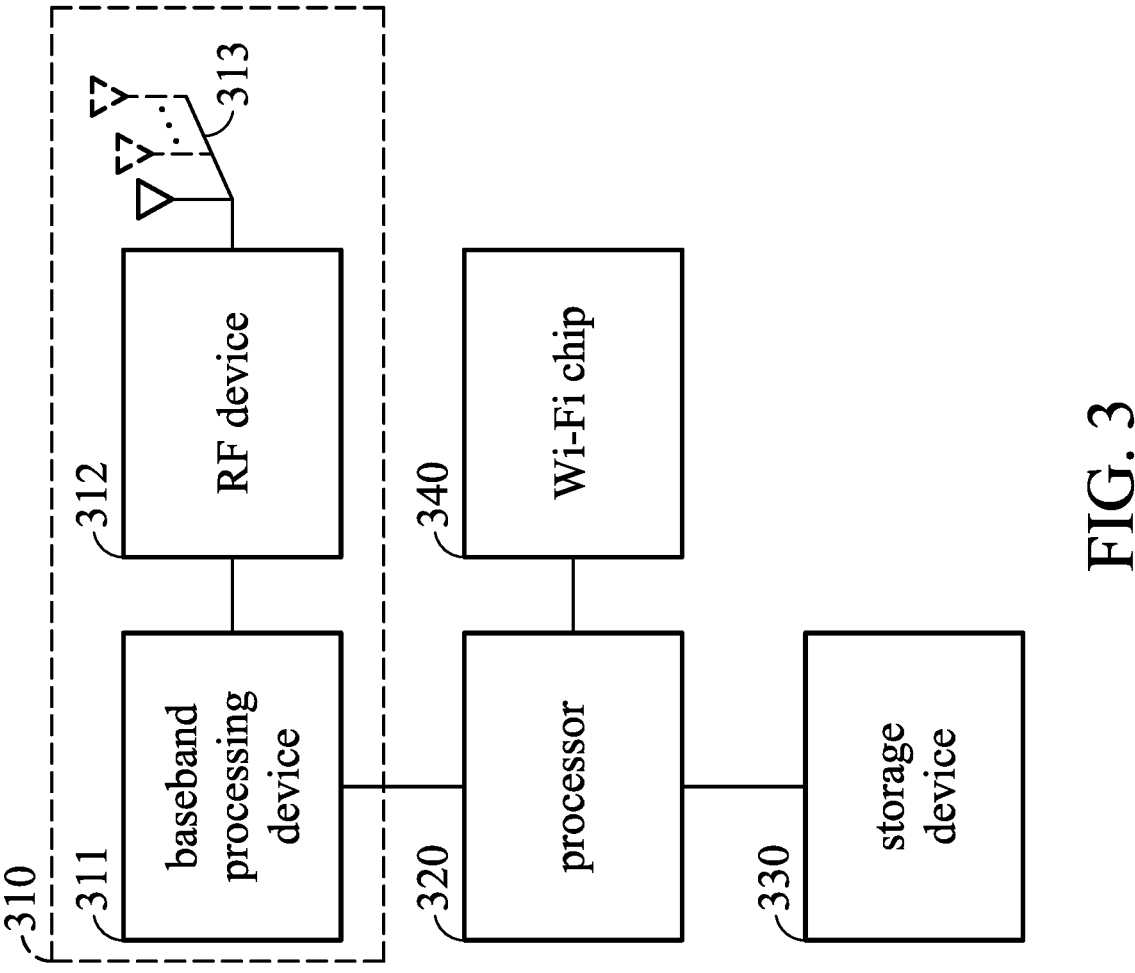
FIG. 3 is a block diagram illustrating an AP according to an embodiment of the application.

FIG. 3 is a block diagram illustrating an AP according to an embodiment of the application. The AP 300 can be applied to the AP 110. As shown in FIG. 3, the AP 300 may include a wireless transceiver 310, a processor 320, a storage device 330 and a Wi-Fi chip 340.

The wireless transceiver 310 is configured to perform wireless transmission and reception to and from one or more communication apparatuses (e.g., the communication apparatus 120).

Specifically, the wireless transceiver 310 may include a baseband processing device 311, an RF device 312, and antenna 313, wherein the antenna 313 may include an antenna array for UL/DL MU-MIMO.

The baseband processing device 311 is configured to perform baseband signal processing, such as ADC/DAC, gain adjusting, modulation/demodulation, encoding/decoding, and so on. The baseband processing device 311 may contain multiple hardware components, such as a baseband processor, to perform the baseband signal processing.

The RF device 312 may receive RF wireless signals via the antenna 313, convert the received RF wireless signals to baseband signals, which are processed by the baseband processing device 311, or receive baseband signals from the baseband processing device 311 and convert the received baseband signals to RF wireless signals, which are later transmitted via the antenna 313. The RF device 312 may also contain multiple hardware devices to perform radio frequency conversion. For example, the RF device 312 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 320 may be a general-purpose processor, an MCU, an application processor, a DSP, a GPH/HPU/NPU, or the like, which includes various circuits for providing the functions of data processing and computing, controlling the wireless transceiver 310 for wireless communications with the communication apparatus 120, and storing and retrieving data (e.g., program code) to and from the storage device 330.

In particular, the processor 320 coordinates the aforementioned operations of the wireless transceiver 310, the storage device 330 and the Wi-Fi chip 340 for performing the method of the present application.

In another embodiment, the processor 320 may be incorporated into the baseband processing device 311, to serve as a baseband processor.

As will be appreciated by persons skilled in the art, the circuits of the processor 320 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 330 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the method of the present application.

According to an embodiment of the invention, the Wi-Fi chip 340 may be configured to perform the operations of Wi-Fi communications. Details of the architecture of the Wi-Fi chip are discussed below via FIG. 4 and FIG. 9. In another embodiment of the invention, the wireless transceiver 310 may be also combined with the Wi-Fi chip 340 to form a Wi-Fi chip.

It should be understood that the components described in the embodiment of FIG. 3 are for illustrative purposes only and are not intended to limit the scope of the application. For example, an AP may include more components, such as a display device for providing a display function, and/or an I/O device for providing an MMI for interaction with users.

Figure 4:
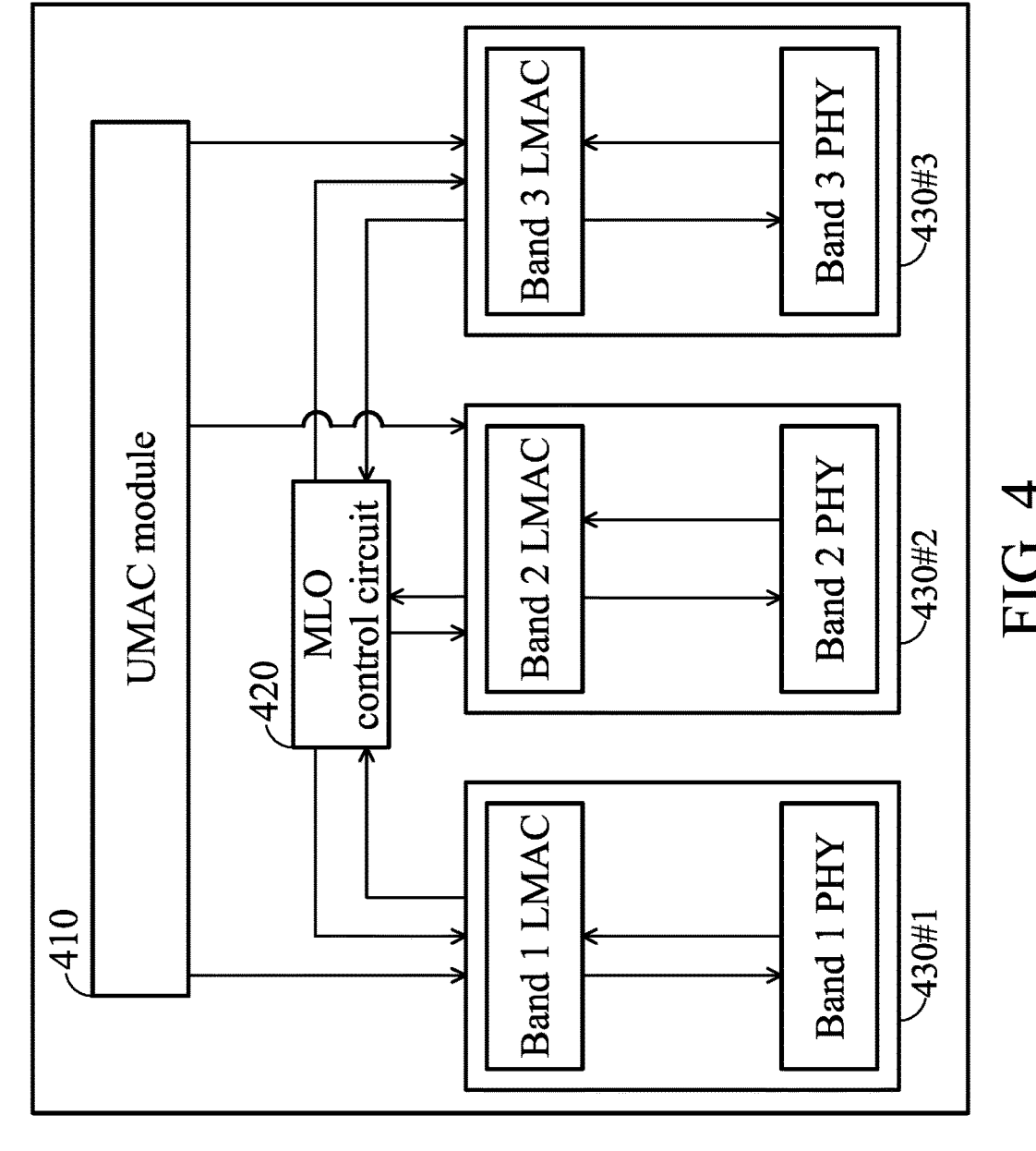
FIG. 4 is a block diagram illustrating a Wi-Fi chip according to an embodiment of the application.

FIG. 4 is a block diagram illustrating a Wi-Fi chip according to an embodiment of the application. The Wi-Fi chip 400 can be applied to the AP 110 and the communication apparatus 120. As shown in FIG. 4, if the Wi-Fi chip 400 is applied to the communication apparatus 120, the Wi-Fi chip 400 may comprise an upper medium-access-control (UMAC) module 410, an MLO control circuit 420, and a plurality of STA modules 430 #1. 430 #2 and 430 #3. That is, if the Wi-Fi chip 400 is applied to the AP 110, the STA modules may be replaced by a plurality of AP modules, wherein one STA module may be corresponded to one AP module for a link (or a channel, or a band). It should be noted that, in order to clarify the concept of the invention, FIG. 4 presents a simplified block diagram in which only the elements relevant to the invention are shown. However, the invention should not be limited to what is shown in FIG. 4. The Wi-Fi chip 400 may also comprise other elements. For example, the Wi-Fi chip 400 may also comprise two or more than three STA modules.

The UMAC 410 may dispatch TX data to each STA module. The MLO control circuit 420 may control the operations of synchronous transmission (TX) start for the non-simultaneous transmission and reception (NSTR) STA modules in a group (e.g., a waiting group). For example, the MLO control circuit 420 may control the synchronous TX start operations of the STA modules 430 #1. 430 #2 and 430 #3. According to the embodiments of the invention, the operations for synchronous TX start performed by the MLO control circuit 420 may be called centralized architecture.

As shown in FIG. 4, each STA module may correspond to a different link for different band. For example, the STA module 430 #1 corresponding to link 1 may be used for Band 1 (e.g., 2.4 GHz), the STA module 430 #2 corresponding to link 2 may be used for Band 2 (e.g., 5 GHz), and the STA module 430 #3 corresponding to link 3 may be used for Band 3 (e.g., 6 GHz), but the invention should not be limited thereto. In addition, as shown in FIG. 4, each STA module may comprise a lower MAC (LMAC) module and a physical (PHY) module. The UMAC module 410 may dispatch TX data to each LMAC module of each STA module. The MLO control circuit 420 may communicate with each STA module through the LMAC module of each STA module.

According to an embodiment of the invention, the STA modules of an apparatus (e.g., communication apparatus 120) may each perform a respective backoff procedure. When the first backoff counter of the first STA module reaches 0 in its backoff procedure, the MLO control circuit of the apparatus may determine whether to perform a synchronous TX for the first STA module and other STA modules in the same waiting group as the first STA module. Details of the operations of the MLO control circuit will be illustrated in FIG. 5~FIG. 8 below.

Figure 5:
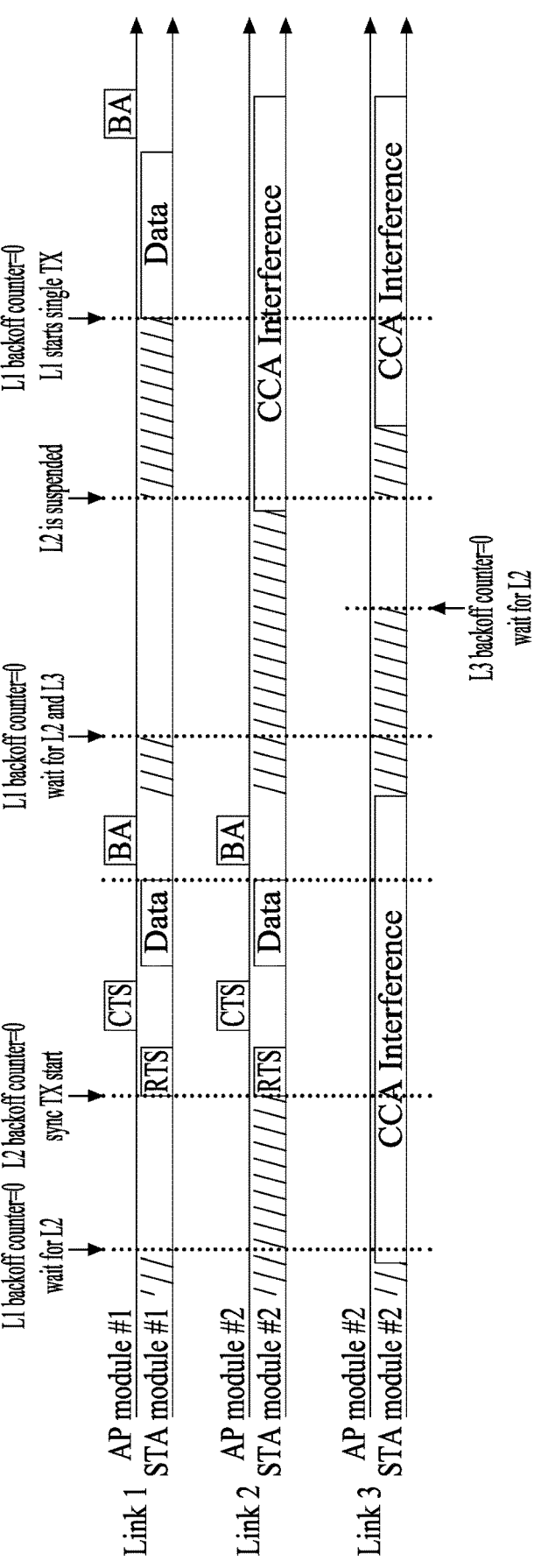
FIG. 5 is a schematic diagram illustrating a synchronous TX start operations associate with the MLO control circuit according to an embodiment of the application.

FIG. 5 is a schematic diagram illustrating a synchronous TX start operations associate with the MLO control circuit according to an embodiment of the application. The synchronous TX start operations shown in FIG. 5 can be applied to Wi-Fi chip 400 of FIG. 4. As shown in FIG. 5, the STA module #1 and the AP module #1 may correspond to the link 1, the STA module #2 and the AP module #2 may correspond to the link 2, and the STA module #3 and the AP module #3 may correspond to the link 3. In the embodiment, it may be assumed that any two pairs of links belongs to an NSTR link-pair, e.g., link 1 and link 2 are NSTR link-pair, link 1 and link 3 are NSTR link-pair, and link 2 and link 3 are NSTR link-pair, and assumed that the STA module #1, the STA module #2 and STA module #3 are assigned in the same waiting group by the MLO control circuit. It is should be noted that FIG. 5 is only illustrated embodiment of the invention, but the invention should not be limited thereto.

The STA module #1, the STA module #2 and the STA module #3 may each perform its respective backoff procedure. When the backoff counter of STA module #1 reaches 0 (i.e., link 1 (L1) backoff counter=0) in its backoff procedure, the STA module #1 may notify the MLO control circuit that its backoff counter has reached 0. Then, the MLO control circuit may decide to wait for the STA module #2 in the same waiting group as the STA module #1 until the backoff counter of STA module #2 has reached 0. Because a clear channel assessment (CCA) interference occurs in the STA module #3, the MLO control circuit may not wait for the STA module #3. When the backoff counter of STA module #2 reaches 0 (i.e., L2 backoff counter=0), the MLO control circuit may transmit the TX start request to the STA module #1 and the STA module #2 respectively to begin the synchronous TX between the STA module #1 and the STA module #2. When the STA module #1 and the STA module #2 receive the TX start request, the STA module #1 and the STA module #2 may begin to perform synchronous TX with its corresponding AP module at the same time.

In addition, when the backoff counter of STA module #1 reaches 0 in its next backoff procedure, the STA module #1 may notify the MLO control circuit that its backoff counter has reached 0 (i.e., L1 backoff counter=0). Then, the MLO control circuit may decide to wait for the STA module #2 and STA module #3 in the same waiting group as the STA module #1 until the backoff counter of STA module #2 has reached 0 (i.e., L2 backoff counter=0) and the backoff counter of STA module #3 has reached 0 (i.e., L3 backoff counter=0). Then, when the backoff counter of STA module #3 reaches 0, the MLO control circuit may decide to wait for the STA module #2. However, the backoff procedure of the STA module #2 is suspended (e.g., the medium of STA module #2 becomes busy or interference occurs in the STA module #2) while the MLO control circuit decides to wait for the STA module #2. Therefore, the MLO control circuit may indicate the STA module #1 and the STA module #3 to restart its backoff procedure (i.e., reload its backoff counter and restart the count down process). When the backoff counter of STA module #1 reaches 0 again, because the CCA interference occurs in the STA module #2 and the STA module #3, the MLO control circuit may indicate the STA module #1 to perform a single link TX in its link.

Figure 6A:
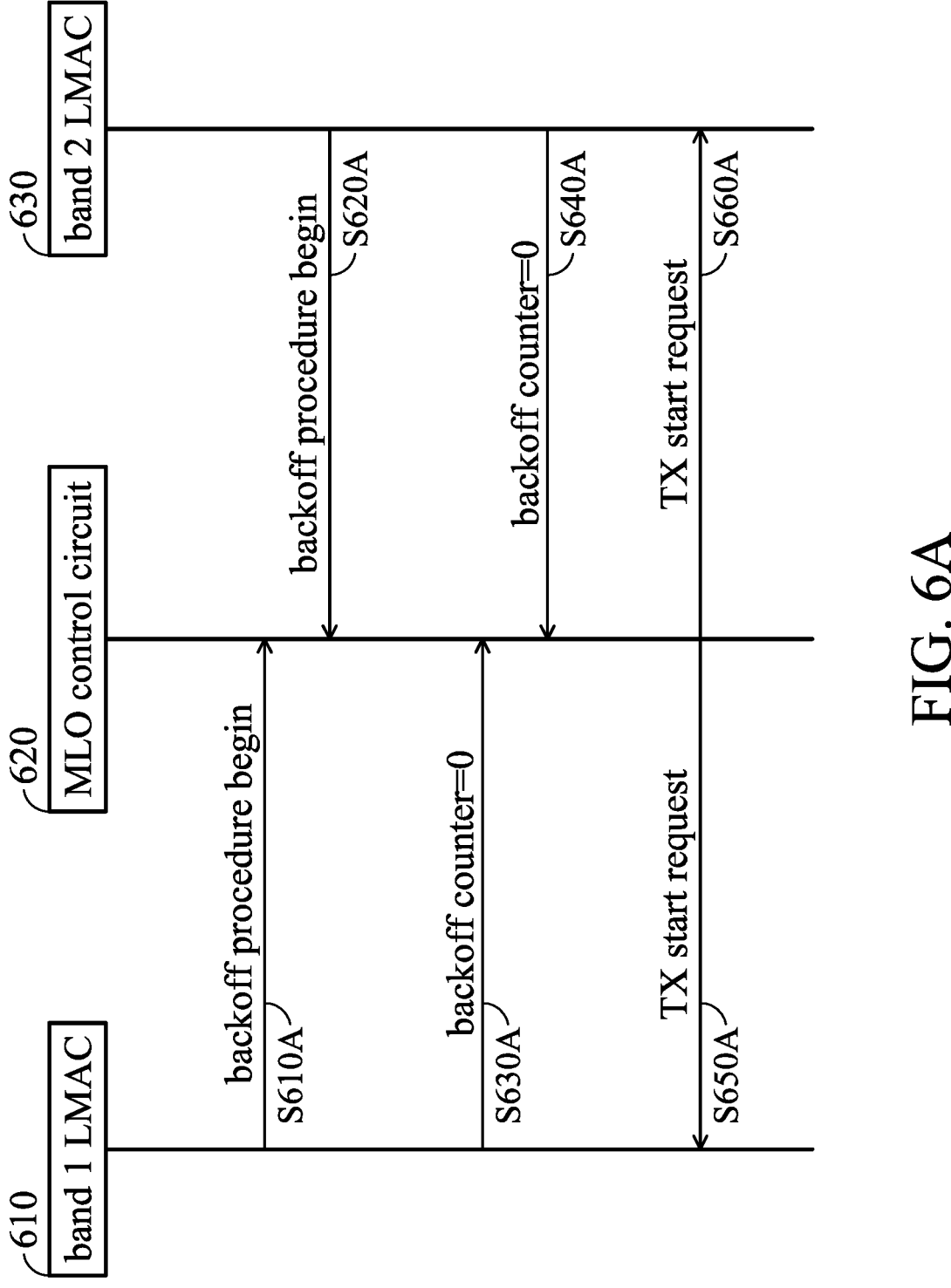
FIG. 6A is a flow chart illustrating a process for synchronous TX start based on the centralized architecture according to an embodiment of the invention.

FIG. 6A is a flow chart illustrating a process for synchronous TX start based on the centralized architecture according to an embodiment of the invention. The process may be applied to the Wi-Fi chip 400 of FIG. 4. As shown in FIG. 6A, in step S610A, the LMAC module 610 for band 1 may notify the MLO control circuit 620 that the backoff procedure of the LMAC module 610 has begun.

In step S620A, the LMAC module 630 for band 2 may notify the MLO control circuit 620 that the backoff procedure of the LMAC module 630 has begun.

In step S630A, the LMAC module 610 for band 1 may notify the MLO control circuit 620 that the backoff counter of the LMAC module 610 has reached 0. The MLO control circuit 620 may determine to wait for the LMAC module 630.

In step S640A, the LMAC module 630 for band 2 may notify the MLO control circuit 620 that the backoff counter of the LMAC module 630 has reached 0.

In step S650A, the MLO control circuit 620 may transmit a TX start request to the LMAC module 610 to start the synchronous TX for the LMAC module 610 and the LMAC module 630.

In step S660A, the MLO control circuit 620 may transmit a TX start request to the LMAC module 630 to start the synchronous TX for the LMAC module 610 and the LMAC module 630.

Figure 6B:
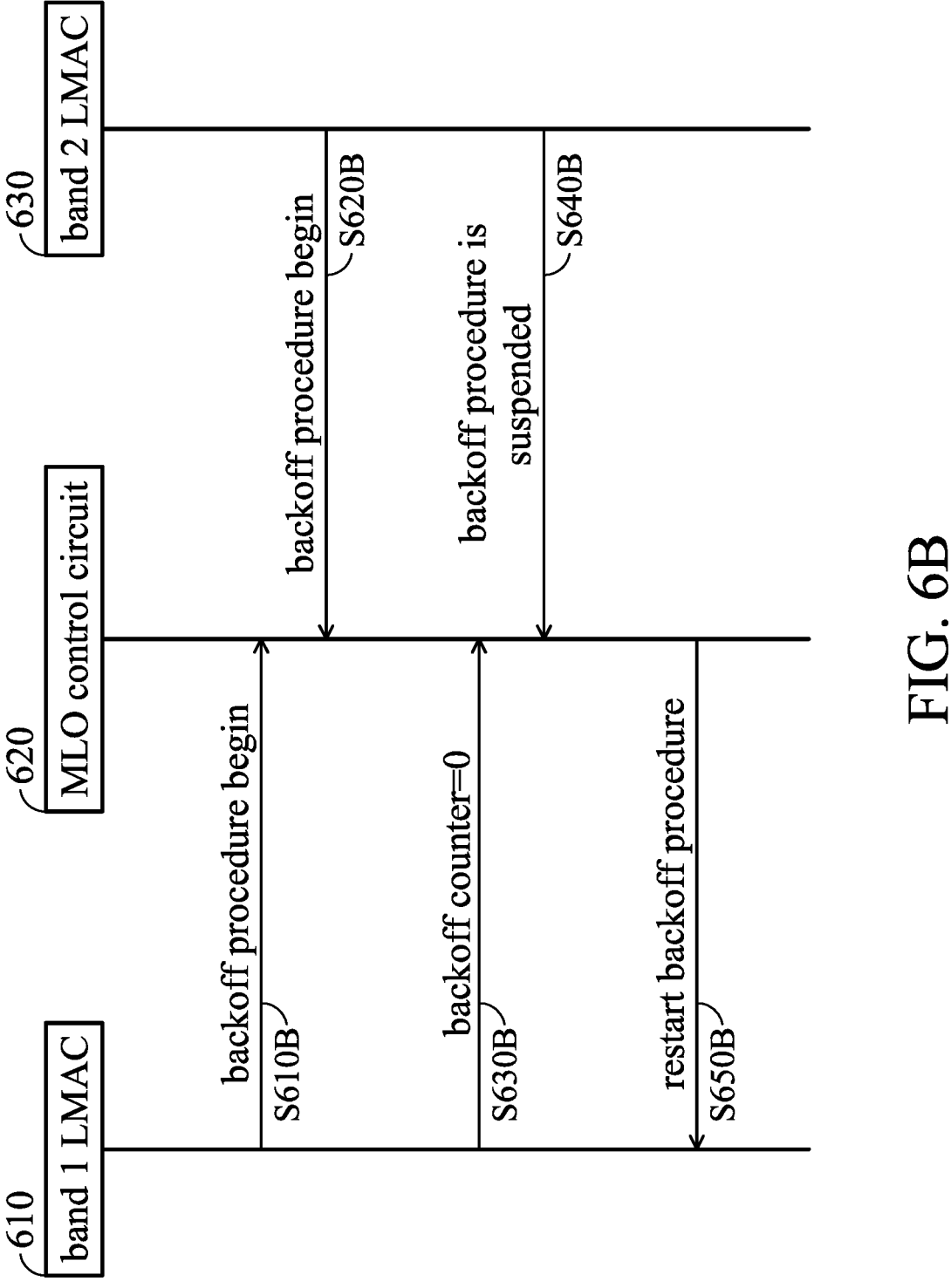
FIG. 6B is a flow chart illustrating a process for synchronous TX start based on the centralized architecture according to another embodiment of the invention.

FIG. 6B is a flow chart illustrating a process for synchronous TX start based on the centralized architecture according to another embodiment of the invention. The process may be applied to the Wi-Fi chip 400 of FIG. 4. As shown in FIG. 6B, in step S610B, the LMAC module 610 for band 1 may notify the MLO control circuit 620 that the backoff procedure of the LMAC module 610 has begun.

In step S620B, the LMAC module 630 for band 2 may notify the MLO control circuit 620 that the backoff procedure of the LMAC module 630 has begun.

In step S630B, the LMAC module 610 for band 1 may notify the MLO control circuit 620 that the backoff counter of the LMAC module 610 has reached 0. The MLO control circuit 620 may determine to wait for the LMAC module 630.

In step S640B, the LMAC module 630 for band 2 may notify the MLO control circuit 620 that the backoff procedure of the LMAC module 630 is suspended (e.g., the medium of the LMAC module 630 becomes busy) while the MLO control circuit 620 is waiting for the LMAC module 630.

In step S650B, the MLO control circuit 620 may indicate the LMAC module 610 for band 1 to restart its backoff procedure.

Figure 6C:
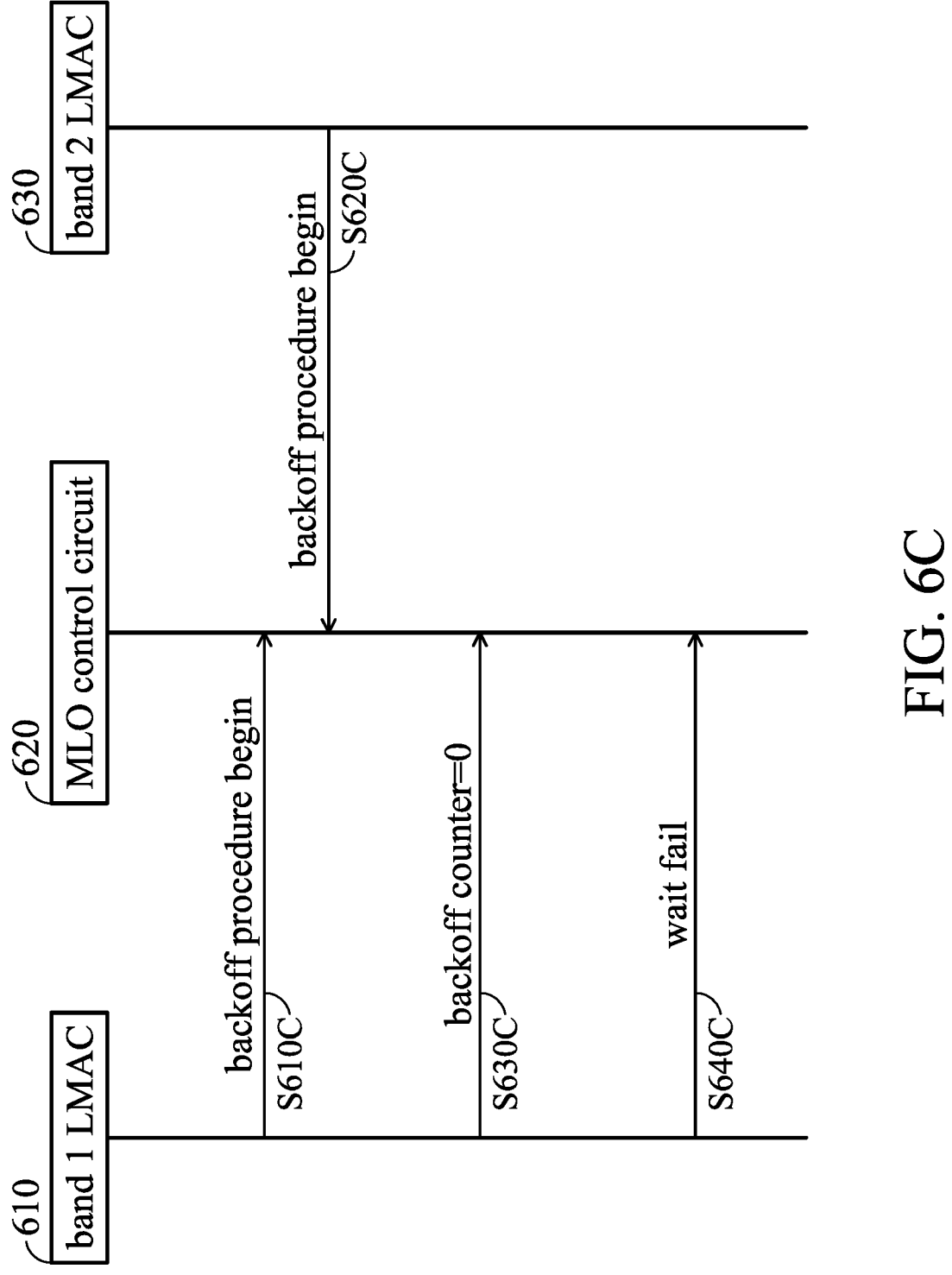
FIG. 6C is a flow chart illustrating a process for synchronous TX start based on the centralized architecture according to another embodiment of the invention.

FIG. 6C is a flow chart illustrating a process for synchronous TX start based on the centralized architecture according to another embodiment of the invention. The process may be applied to the Wi-Fi chip 400 of FIG. 4. As shown in FIG. 6C, in step S610C, the LMAC module 610 for band 1 may notify the MLO control circuit 620 that the backoff procedure of the LMAC module 610 has begun.

In step S620C, the LMAC module 630 for band 2 may notify the MLO control circuit 620 that the backoff procedure of the LMAC module 630 has begun.

In step S630C, the LMAC module 610 for band 1 may notify the MLO control circuit 620 that the backoff counter of the LMAC module 610 has reached 0. The MLO control circuit 620 may determine to wait for the LMAC module 630.

In step S640C, the LMAC module 610 for band 1 may notify the MLO control circuit 620 that a wait fail occurs in the link corresponding to the LMAC module 610 while the MLO control circuit 620 is waiting for the LMAC module 630 (e.g., the link corresponding to the LMAC module 610 failed while the MLO control circuit 620 was waiting for the LMAC module 630). After the MLO control circuit 620 receives the notification from the LMAC module 610, the MLO control circuit 620 may determine not to wait for the LMAC module 630.

Figure 6D:
FIG. 6D is a flow chart illustrating a process for synchronous TX start based on the centralized architecture according to another embodiment of the invention.

FIG. 6D is a flow chart illustrating a process for synchronous TX start based on the centralized architecture according to another embodiment of the invention. The process may be applied to the Wi-Fi chip 400 of FIG. 4. As shown in FIG. 6A, in step S610D, the LMAC module 610 for band 1 may notify the MLO control circuit 620 that the backoff procedure of the LMAC module 610 has begun.

In step S620D, the LMAC module 630 for band 2 may notify the MLO control circuit 620 that the backoff procedure of the LMAC module 630 has begun.

In step S630D, the LMAC module 630 for band 2 may notify the MLO control circuit 620 that the backoff procedure of the LMAC module 630 is suspended (e.g., the medium of the LMAC module 630 becomes busy).

In step S640D, the LMAC module 610 for band 1 may notify the MLO control circuit 620 that the backoff counter of the LMAC module 610 has reached 0.

In step S650D, the MLO control circuit 620 may indicate the LMAC module 610 for band 1 to start to perform single link TX in its link.

In step S660D, the LMAC module 630 for band 2 may notify the MLO control circuit 620 that the backoff procedure of the LMAC module 630 has begun again.

Figure 7:
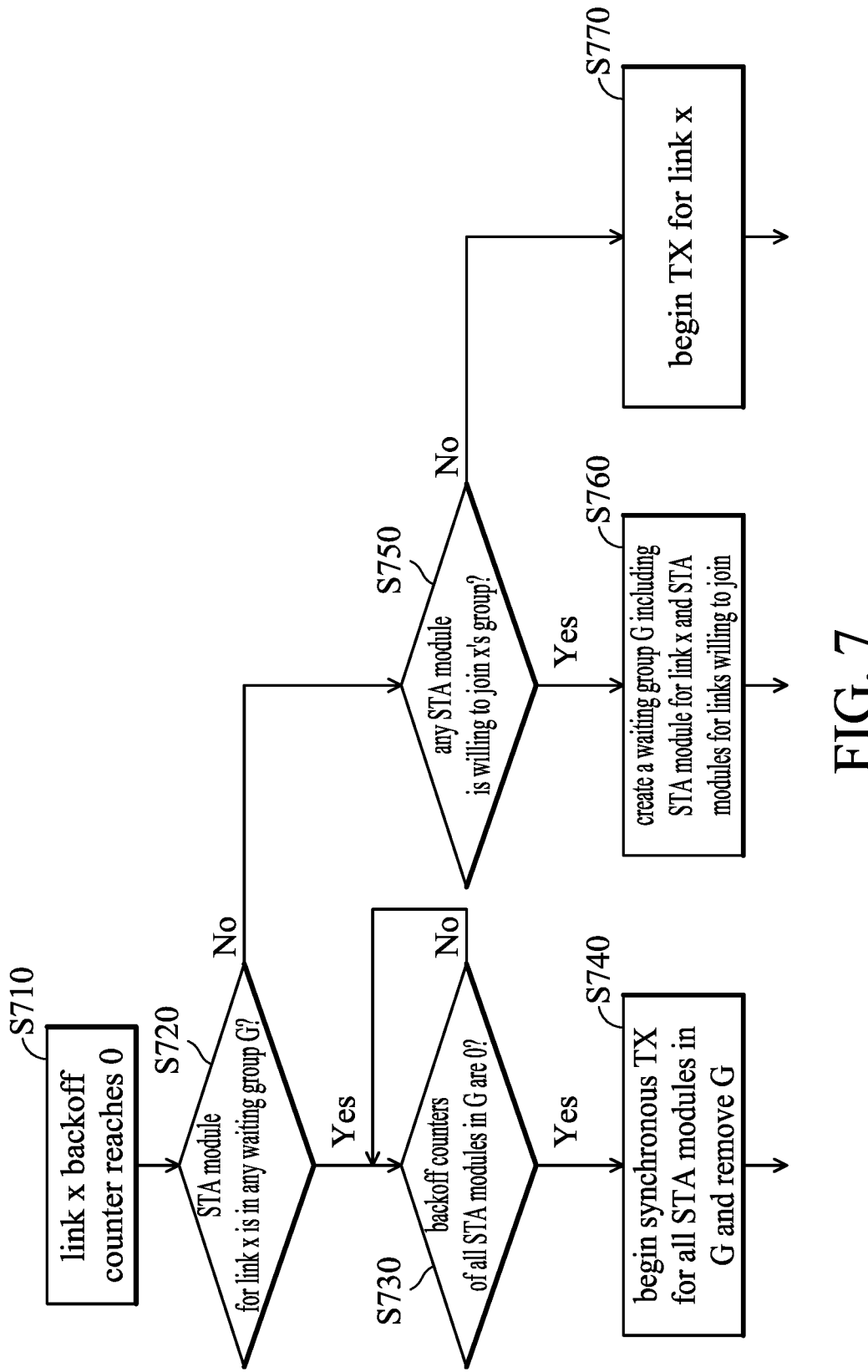
FIG. 7 is a flow chart illustrating an MLO transmission method based on the centralized architecture according to an embodiment of the invention.

FIG. 7 is a flow chart illustrating an MLO transmission method based on the centralized architecture according to an embodiment of the invention. The MLO transmission method 700 can be applied to the Wi-Fi chip 400 of FIG. 4. As shown in FIG. 7, in step S710, the backoff counter corresponding to an STA module for link x reaches 0.

In step S720, the MLO control circuit may determine whether the STA module for link x is in any waiting group G.

If the STA module for link x is in the waiting group G, step S730 is performed. In step S730, the MLO control circuit may determine whether the backoff counters corresponding to STA modules for all links in the group G are 0.

If the backoff counters corresponding to STA modules for all links in the group G are 0, step S740 is performed. In step S740, the MLO control circuit may transmit the TX start request to all STA modules in the group G to begin the synchronous TX for all links in the group G. Then, the MLO control circuit may remove the group G after the synchronous TX for all links in the group G have begun. If the backoff counter corresponding to at least one STA module in the group G are not 0, the MLO control circuit may wait for the STA modules whose backoff counters are not zero.

If the STA module for link x is not in any waiting group G, step S750 is performed. In step S750, the MLO control circuit may determine whether any other STA module is willing to join the group corresponding to the STA module for link x.

If at least one STA module is willing to join the group of the STA module for link x, step S760 is performed. In step S760, the MLO control circuit may create the waiting group G which may comprise the STA module for link x and the STA modules willing to join the group corresponding to the STA module for link x.

If no STA module is willing to join the group corresponding to the STA module for link x, step S770 is performed. In step S770, the MLO control circuit may indicate the STA module for link x to being perform single link TX in the link x.

Figure 8:
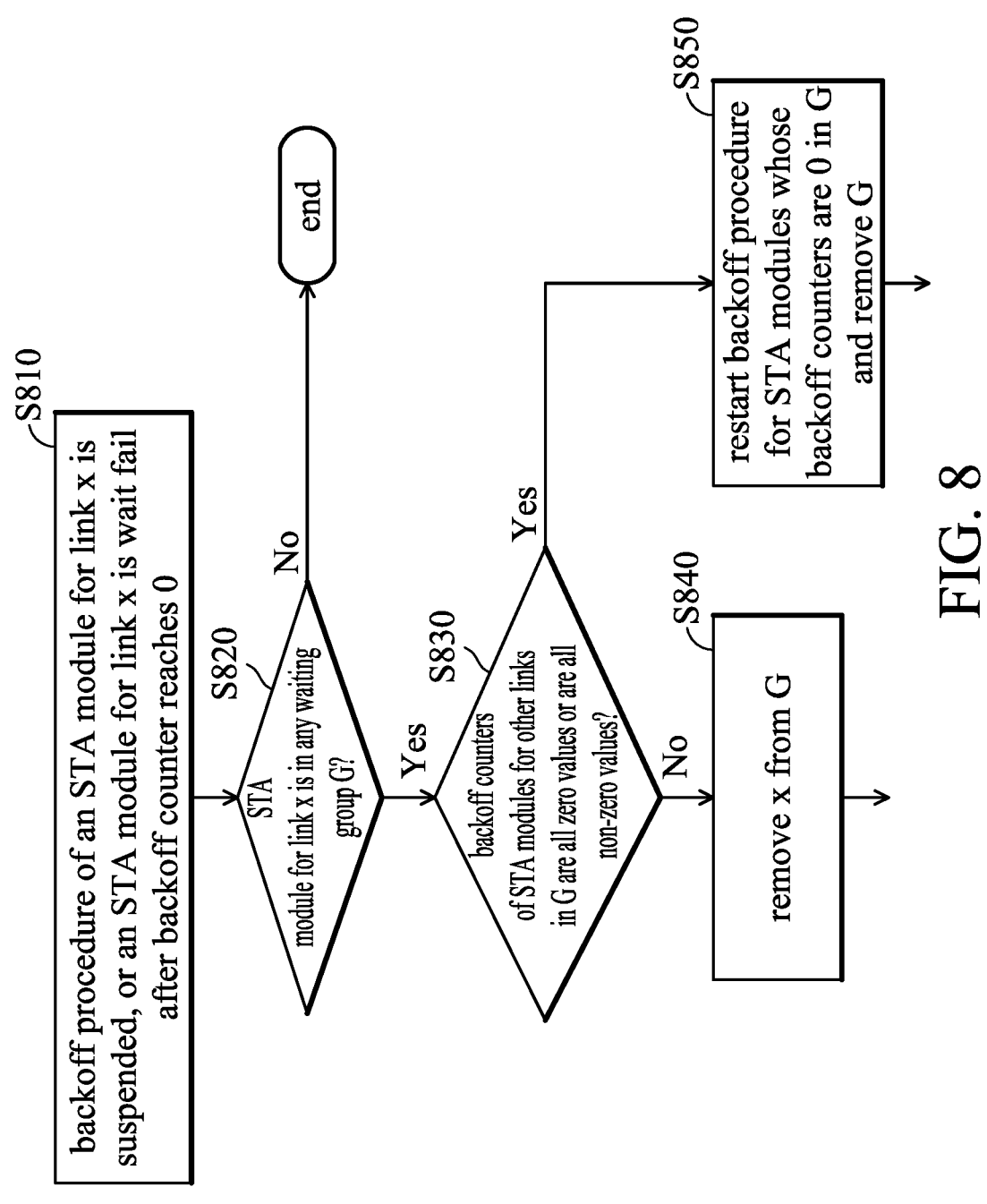
FIG. 8 is a flow chart illustrating an MLO transmission method based on the centralized architecture according to another embodiment of the invention.

FIG. 8 is a flow chart illustrating an MLO transmission method based on the centralized architecture according to another embodiment of the invention. The MLO transmission method 800 can be applied to the Wi-Fi chip 400 of FIG. 4. As shown in FIG. 8, in step S810, the backoff procedure of an STA module for link x is suspended (e.g., the medium of the STA module becomes busy), or a wait fail occurs in the STA module for link x after the backoff counter corresponding to the STA module for link x reaches 0.

In step S820, the MLO control circuit may determine whether the STA module for link x is in any waiting group G.

If the STA module for link x is in the waiting group G, step S830 is performed. In step S830, the MLO control circuit may determine whether the backoff counters corresponding to other STA modules in the waiting group G are all zero values or are all non-zero values.

If the backoff counters of other STA modules in the waiting group G are not all zero values, or are not all non-zero values, step 840 is performed. In step S840, the MLO control circuit may remove the STA module for link x from the waiting group G.

If the backoff counters corresponding to other STA modules in the waiting group G are all zero values or are all non-zero values, step 850 is performed. In step S850, the MLO control circuit may indicate the STA modules whose backoff counters have reached 0 in the waiting group G to restart its backoff procedure. Then, the MLO control circuit may remove the waiting group G. In addition, when the backoff counter of all other STA modules in the waiting group G are all non-zero values, the backoff procedure of these STA modules will not be suspended.

Figure 9:
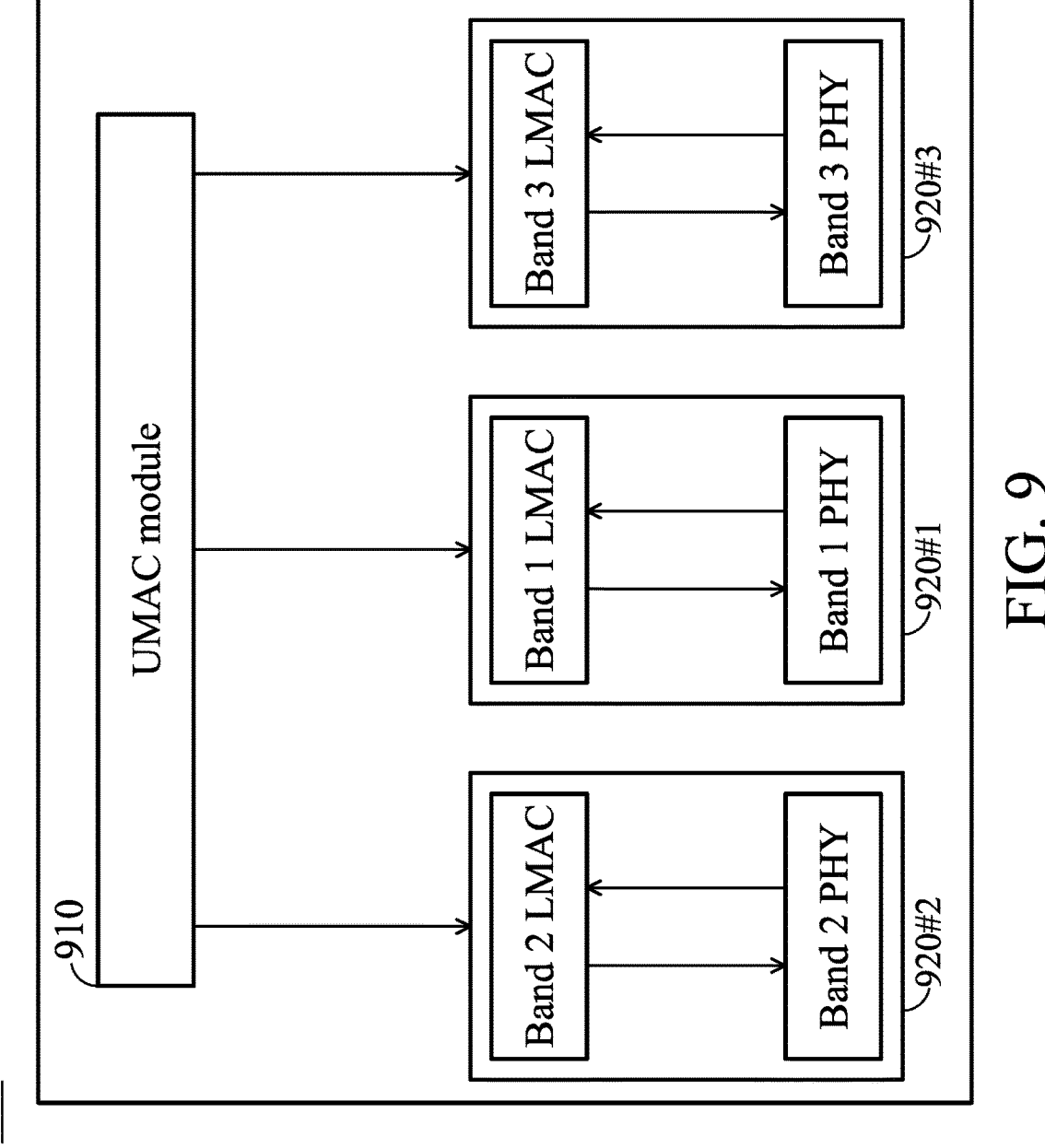
FIG. 9 is a block diagram illustrating a Wi-Fi chip according to another embodiment of the application.

FIG. 9 is a block diagram illustrating a Wi-Fi chip according to another embodiment of the application. The Wi-Fi chip 900 can be applied to the AP 110 and the communication apparatus 120. As shown in FIG. 9, if the Wi-Fi chip 900 is applied to the communication apparatus 120, the Wi-Fi chip 900 may comprise an upper medium-access-control (UMAC) module, 910, and a plurality of STA modules 920 #1. 920 #2 and 920 #3. That is, if the Wi-Fi chip 900 is applied to the AP 110, the STA modules may be replaced by a plurality of AP modules, wherein one STA module may be corresponded to one AP module for a link (or a channel, or a band). It should be noted that, in order to clarify the concept of the invention, FIG. 9 presents a simplified block diagram in which only the elements relevant to the invention are shown. However, the invention should not be limited to what is shown in FIG. 9. The Wi-Fi chip 900 may also comprise other elements. For example, the Wi-Fi chip 900 may also comprise two or more than three STA modules.

The UMAC 910 may dispatch TX data to each STA module. In addition, in the embodiment, it is assumed that the STA module 920 #1 is used to control the operations of synchronous transmission (TX) start for the non-simultaneous transmission and reception (NSTR) STA modules in a group (e.g., a waiting group). That is in the embodiment, the STA module 920 #1 may be regarded as the group owner. For example, the STA modules 920 #1 may control the synchronous TX start operations of the STA modules 920 #1. 920 #2 and 920 #3. According to the embodiments of the invention, the operations for synchronous TX start performed by one STA module may be called distributed architecture.

As shown in FIG. 9, each STA module may correspond to a different link for different band. For example, the STA module 920 #1 corresponding to link 1 may be used for Band 1 (e.g., 2.4 GHz), the STA module 920 #2 corresponding to link 2 may be used for Band 2 (e.g., 5 GHz), and the STA module 920 #3 corresponding to link 3 may be used for Band 3 (e.g., 6 GHz), but the invention should not be limited thereto. In addition, as shown in FIG. 9, each STA module may comprise a lower MAC (LMAC) module and a physical (PHY) module. The UMAC module 910 may dispatch TX data to each LMAC module of each STA module. The LMAC module of the STA module 920 #1 may control the operations of synchronous transmission (TX) start for the non-simultaneous transmission and reception (NSTR) STA modules in a group (e.g., a waiting group).

According to an embodiment of the invention, the STA modules of an apparatus (e.g., communication apparatus 120) may each perform a respective backoff procedure. When the first backoff counter of the first STA module of the apparatus reaches 0 in its backoff procedure, the first STA module may determine whether to perform a synchronous TX for the first STA module and other STA modules in the same waiting group as the first STA module. Details of the operations of the first STA module will be illustrated in FIG. 10-FIG. 13 below.

Figure 10:
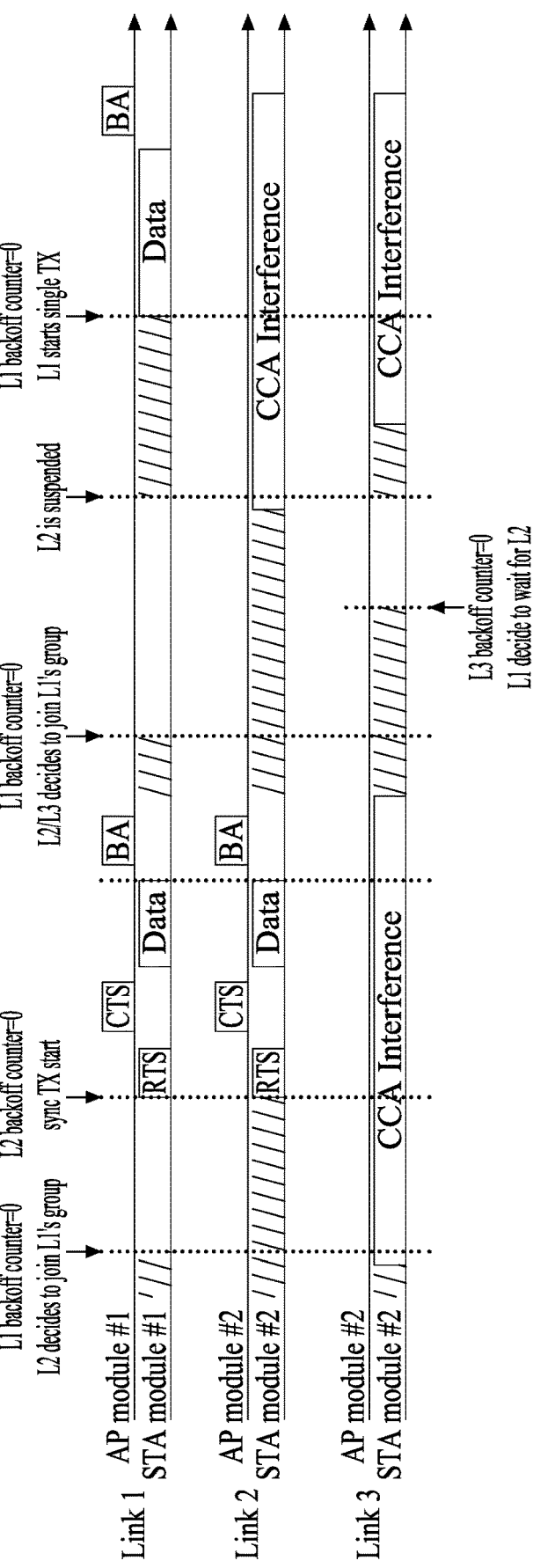
FIG. 10 is a schematic diagram illustrating a synchronous TX start operations associate with the STA module according to an embodiment of the application.

FIG. 10 is a schematic diagram illustrating a synchronous TX start operations associate with the STA module according to an embodiment of the application. The synchronous TX start operations shown in FIG. 10 can be applied to Wi-Fi chip 900 of FIG. 9. As shown in FIG. 10, the STA module #1 and the AP module #1 may correspond to the link 1, the STA module #2 and the AP module #2 may correspond to the link 2, and the STA module #3 and the AP module #3 may correspond to the link 3. In the embodiment, it may be assumed that any two pairs of links belongs to an NSTR link-pair, e.g., link 1 and link 2 are NSTR link-pair, link 1 and link 3 are NSTR link-pair and link 2 and link 3 are NSTR link-pair. It is should be noted that FIG. 10 is only illustrated embodiment of the invention, but the invention should not be limited thereto.

The STA module #1, the STA module #2 and the STA module #3 may perform its respective backoff procedure. When the backoff counter (i.e., L1 backoff counter) of STA module #1 reaches 0 in its backoff procedure, the STA module #1 may notify the STA module #2 that its backoff counter has reached 0 to ask the STA module #2 whether it wants to join its waiting group, i.e., the STA module #1 is the group owner of the waiting group.

Then, the STA module #2 may decide to join the waiting group of the STA module #1. Because a clear channel assessment (CCA) interference occurs in the STA module #3, when the STA module #1 notifies the STA module #3 that its backoff counter has reached 0 to ask the STA module #3 whether it wants to join its waiting group, the STA module #3 may reject to joint the STA module #1's waiting group. When the backoff counter of STA module #2 reaches 0, the STA module #1 may transmit the TX start request to the STA module #2 to begin the synchronous TX between the STA module #1 and the STA module #2. When the STA module #2 receives the TX start request, the STA module #1 and the STA module #2 may begin to perform synchronous TX with its corresponding AP module at the same time.

In addition, when the backoff counter of STA module #1 reaches 0 in its next backoff procedure, the STA module #1 may notify the STA module #2 and the STA module #3 that its backoff counter has reached 0 to ask the STA module #2 and the STA module #3 whether want to join its waiting group. Then, the STA module #2 and the STA module #3 may decide to join the waiting group of the STA module #1. When the backoff counter of STA module #3 reaches 0, the STA module #1 may keep waiting for the STA module #2. However, the backoff procedure of the STA module #2 is suspended (e.g., the medium of STA module #2 becomes busy) while the STA module #1 is waiting for the STA module #2. Therefore, the STA module #1 may indicate the STA module #3 to restart its backoff procedure (i.e., reload its backoff counter and restart the backoff counter count down procedure). When the backoff counter of STA module #1 reaches 0 again, after STA module #1 receives the reject indication for joining its waiting group responded from STA module #2 and STA module #3 due to the CCA interference occurs in link 2 and link 3, the STA module #1 may decide to perform a single link TX in its link.

Figure 11A:
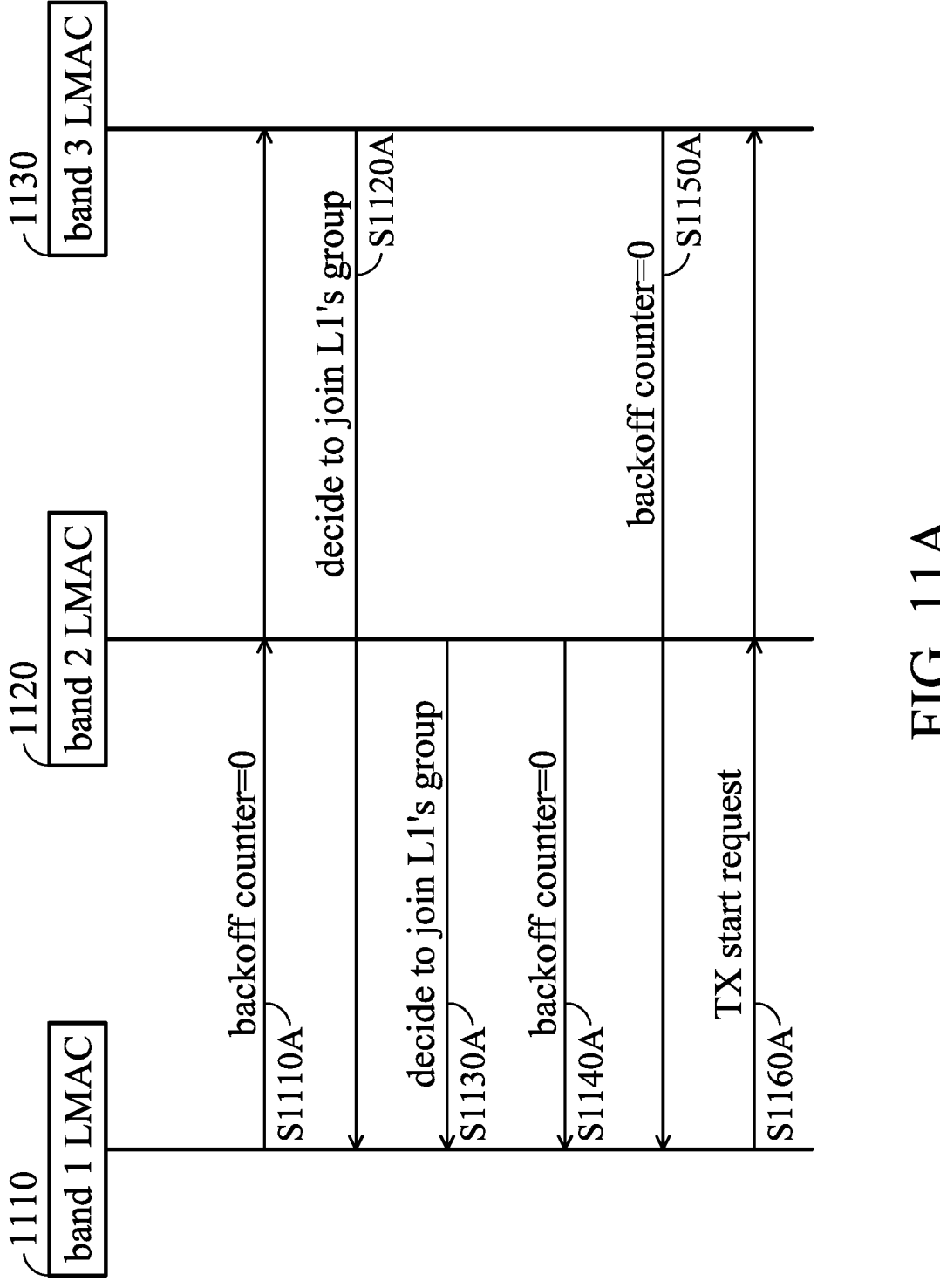
FIG. 11A is a flow chart illustrating a process for synchronous TX start based on the distributed architecture according to an embodiment of the invention.

FIG. 11A is a flow chart illustrating a process for synchronous TX start based on the distributed architecture according to an embodiment of the invention. The process may be applied to the Wi-Fi chip 900 of FIG. 9. As shown in FIG. 11A, in step S1110A, the LMAC module 1110 for band 1 (or link 1) may notify the LMAC module 1120 for band 2 and the LMAC module 1130 for band 3 that its backoff counter has reached 0 (i.e., backoff counter=0).

In step S1120A, the LMAC module 1130 for band 3 may decide to join the waiting group of the LMAC module 1110 for band 1 (i.e., L1 's group).

In step S1130A, the LMAC module 1120 for band 2 may decide to join the waiting group of the LMAC module 1110 for band 1 (i.e., L1 's group).

In step S1140A, the LMAC module 1120 for band 2 may notify the LMAC module 1110 for band 1 that the backoff counter of the LMAC module 1120 has reached 0.

In step S1150A, the LMAC module 1130 for band 3 may notify the LMAC module 1110 for band 1 that the backoff counter of the LMAC module 1130 has reached 0.

In step S1160A, the LMAC module 1110 for band 1 may transmit the TX start requests to the LMAC module 1120 for band 2 and the LMAC module 1130 for band 3 to start the synchronous TX for the LMAC module 1110, the LMAC module 1120 and the LMAC module 1130.

Figure 11B:
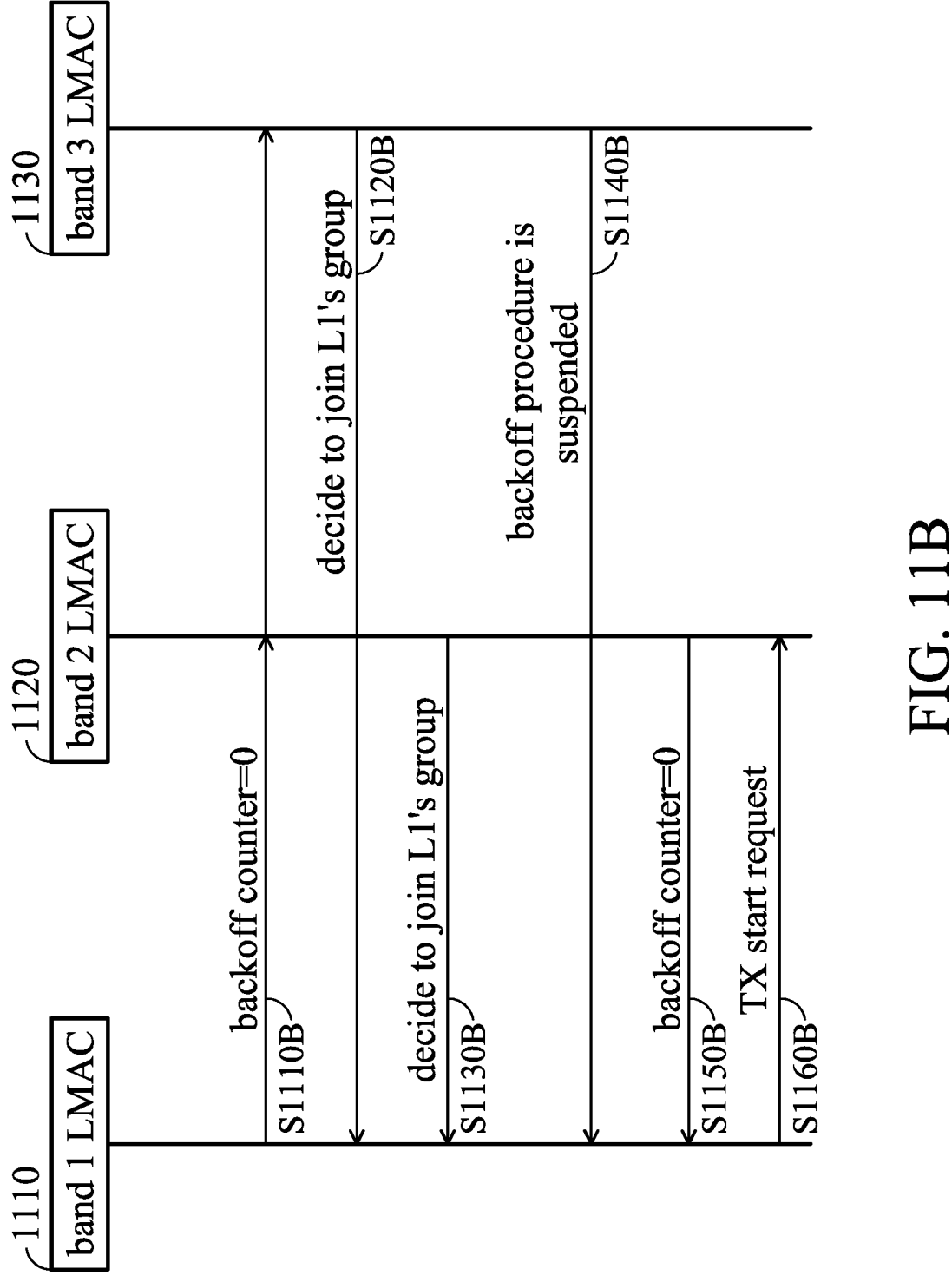
FIG. 11B is a flow chart illustrating a process for synchronous TX start based on the distributed architecture according to another embodiment of the invention.

FIG. 11B is a flow chart illustrating a process for synchronous TX start based on the distributed architecture according to another embodiment of the invention. The process may be applied to the Wi-Fi chip 900 of FIG. 9. As shown in FIG. 11B, in step S1110B, the LMAC module 1110 for band 1 (or link 1) may notify the LMAC module 1120 for band 2 and the LMAC module 1130 for band 3 that its backoff counter has reached 0 (i.e., backoff counter=0).

In step S1120B, the LMAC module 1130 for band 3 may decide to join the waiting group of the LMAC module 1110 for band 1 (i.e., L1's group).

In step S1130B, the LMAC module 1120 for band 2 may decide to join the waiting group of the LMAC module 1110 for band 1 (i.e., L1's group).

In step S1140B, the LMAC module 1130 for band 3 may notify the LMAC module 1110 for band 1 that the backoff procedure of the LMAC module 1130 is suspended (e.g., the medium of the LMAC module 1130 becomes busy). In addition, the LMAC module 1110 for band 1 may keep waiting for LMAC module 1120 for band 2.

In step S1150B, the LMAC module 1120 for band 2 may notify the LMAC module 1110 for band 1 that the backoff counter of the LMAC module 1120 has reached 0.

In step S1160B, the LMAC module 1110 for band 1 may transmit a TX start request to the LMAC module 1120 for band 2 to start the synchronous TX for the LMAC module 1110 and the LMAC module 1120.

Figure 11C:
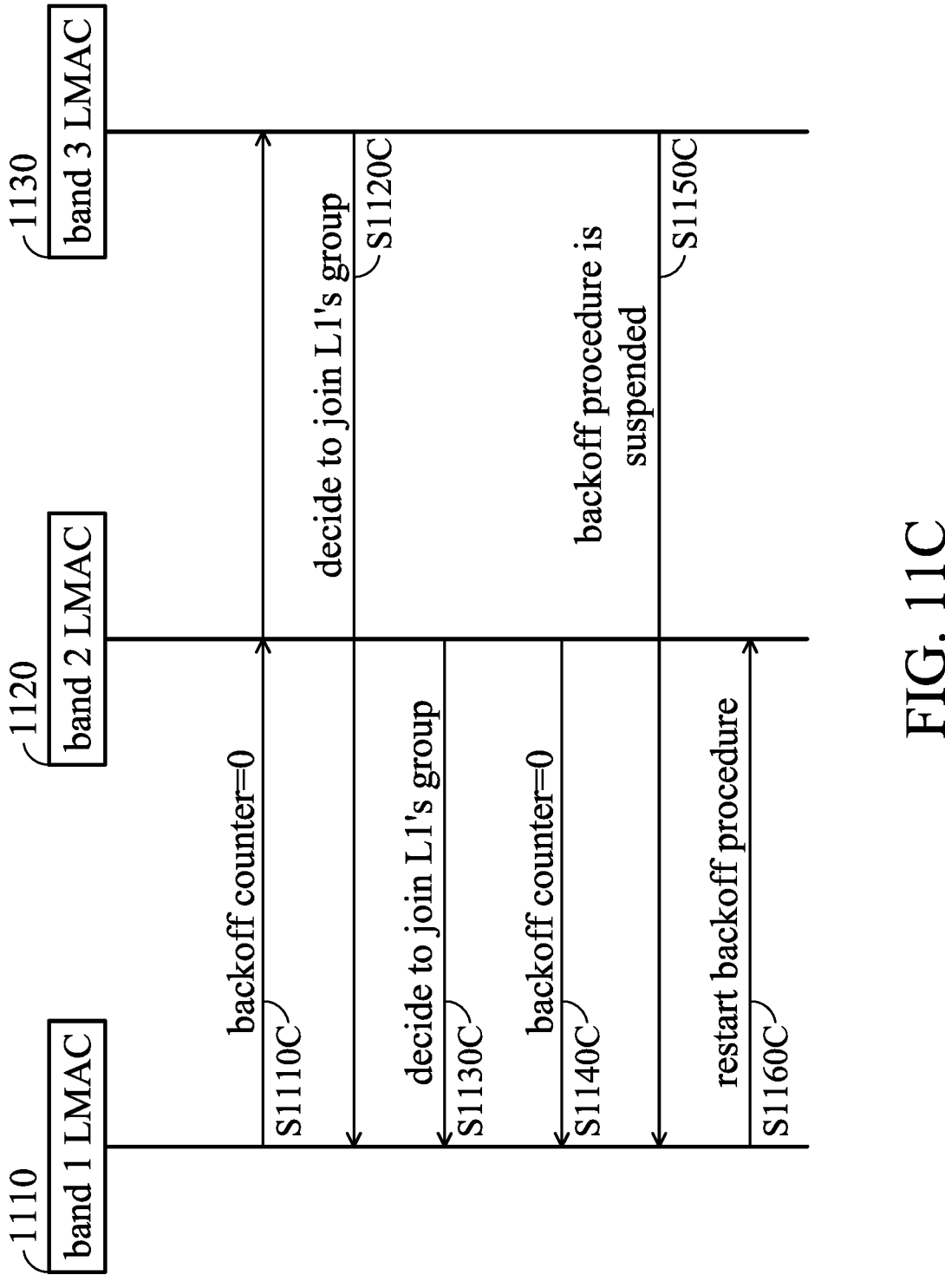
FIG. 11C is a flow chart illustrating a process for synchronous TX start based on the distributed architecture according to another embodiment of the invention.

FIG. 11C is a flow chart illustrating a process for synchronous TX start based on the distributed architecture according to another embodiment of the invention. The process may be applied to the Wi-Fi chip 900 of FIG. 9. As shown in FIG. 11C, in step S1110C, the LMAC module 1110 for band 1 (or link 1) may notify the LMAC module 1120 for band 2 and the LMAC module 1130 for band 3 that its backoff counter has reached 0 (i.e., backoff counter=0).

In step S1120C, the LMAC module 1130 for band 3 may decide to join the waiting group of the LMAC module 1110 for band 1 (i.e., L1 's group).

In step S1130C, the LMAC module 1120 for band 2 may decide to join the waiting group of the LMAC module 1110 for band 1 (i.e., L1 's group).

In step S1140C, the LMAC module 1120 for band 2 may notify the LMAC module 1110 for band 1 that the backoff counter of the LMAC module 1120 has reached 0. In addition, the LMAC module 1110 for band 1 may keep waiting for LMAC module 1130 for band 3.

In step S1150C, the LMAC module 1130 for band 3 may notify the LMAC module 1110 for band 1 that the backoff procedure of the LMAC module 1130 is suspended (e.g., the medium of the LMAC module 1130 becomes busy) while the LMAC module 1110 for band 1 is waiting for LMAC module 1130 for band 3.

In step S1160C, the LMAC module 1110 for band 1 may indicate the LMAC module 1120 for band 2 to restart its backoff procedure. In addition, the LMAC module 1110 may also restart its backoff procedure.

Figure 11D:
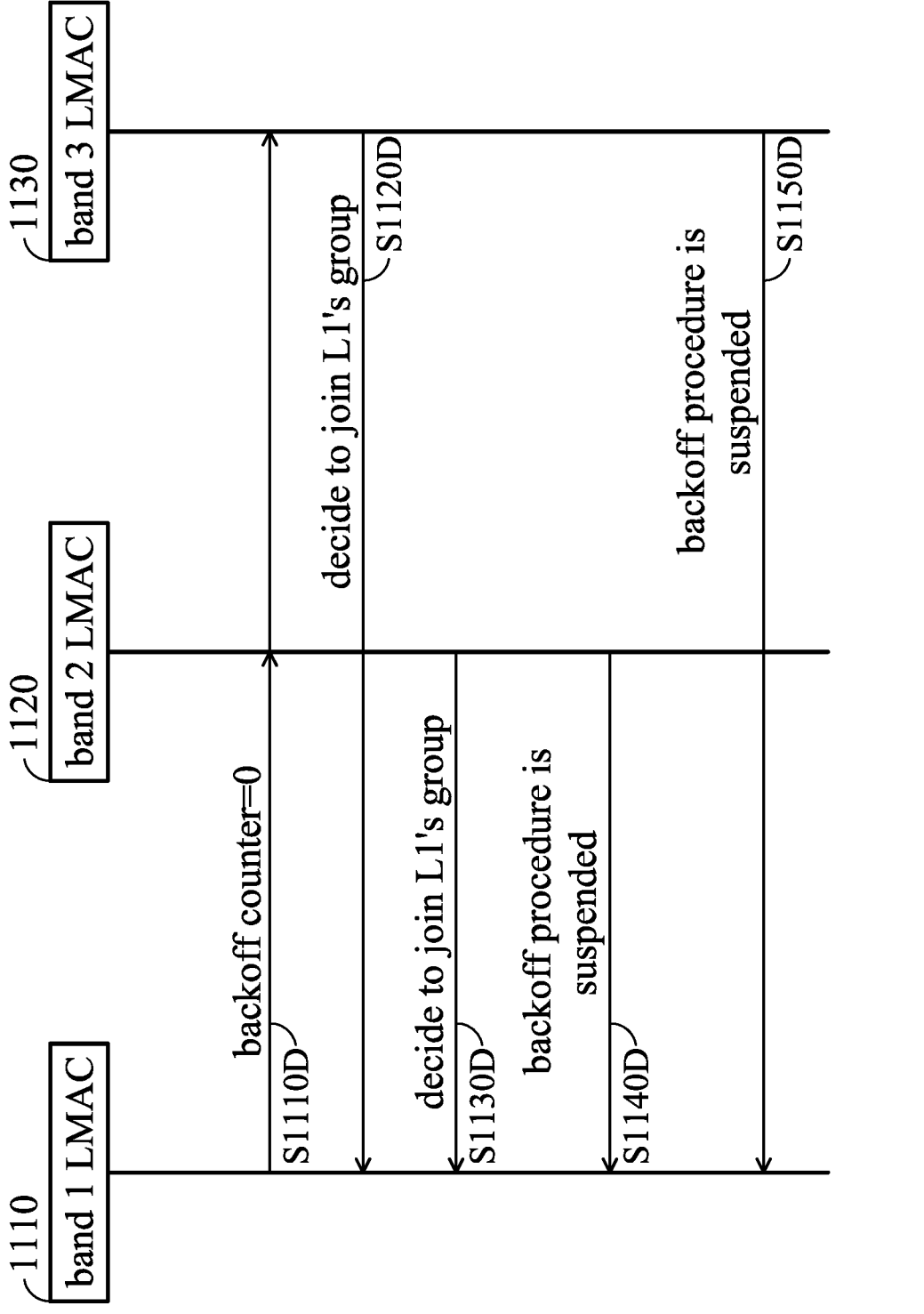
FIG. 11D is a flow chart illustrating a process for synchronous TX start based on the distributed architecture according to another embodiment of the invention.

FIG. 11D is a flow chart illustrating a process for synchronous TX start based on the distributed architecture according to another embodiment of the invention. The process may be applied to the Wi-Fi chip 900 of FIG. 9. As shown in FIG. 11D, in step S1110D, the LMAC module 1110 for band 1 (or link 1) may notify the LMAC module 1120 for band 2 and the LMAC module 1130 for band 3 that its backoff counter has reached 0 (i.e., backoff counter=0).

In step S1120D, the LMAC module 1130 for band 3 may decide to join the waiting group of the LMAC module 1110 for band 1 (i.e., L1 's group).

In step S1130D, the LMAC module 1120 for band 2 may decide to join the waiting group of the LMAC module 1110 for band 1 (i.e., L1 's group).

In step S1140D, the LMAC module 1120 for band 2 may notify the LMAC module 1110 for band 1 that the backoff procedure of the LMAC module 1120 is suspended (e.g., the medium of the LMAC module 1120 becomes busy). In addition, the LMAC module 1110 for band 1 may keep waiting for LMAC module 1130 for band 3.

In step S1150D, the LMAC module 1130 for band 3 may also notify the LMAC module 1110 for band 1 that the backoff procedure of the LMAC module 1130 is suspended (e.g., the medium of the LMAC module 1130 becomes busy). Therefore, LMAC module 1110 for band 1 may restart its backoff procedure.

Figure 11E:
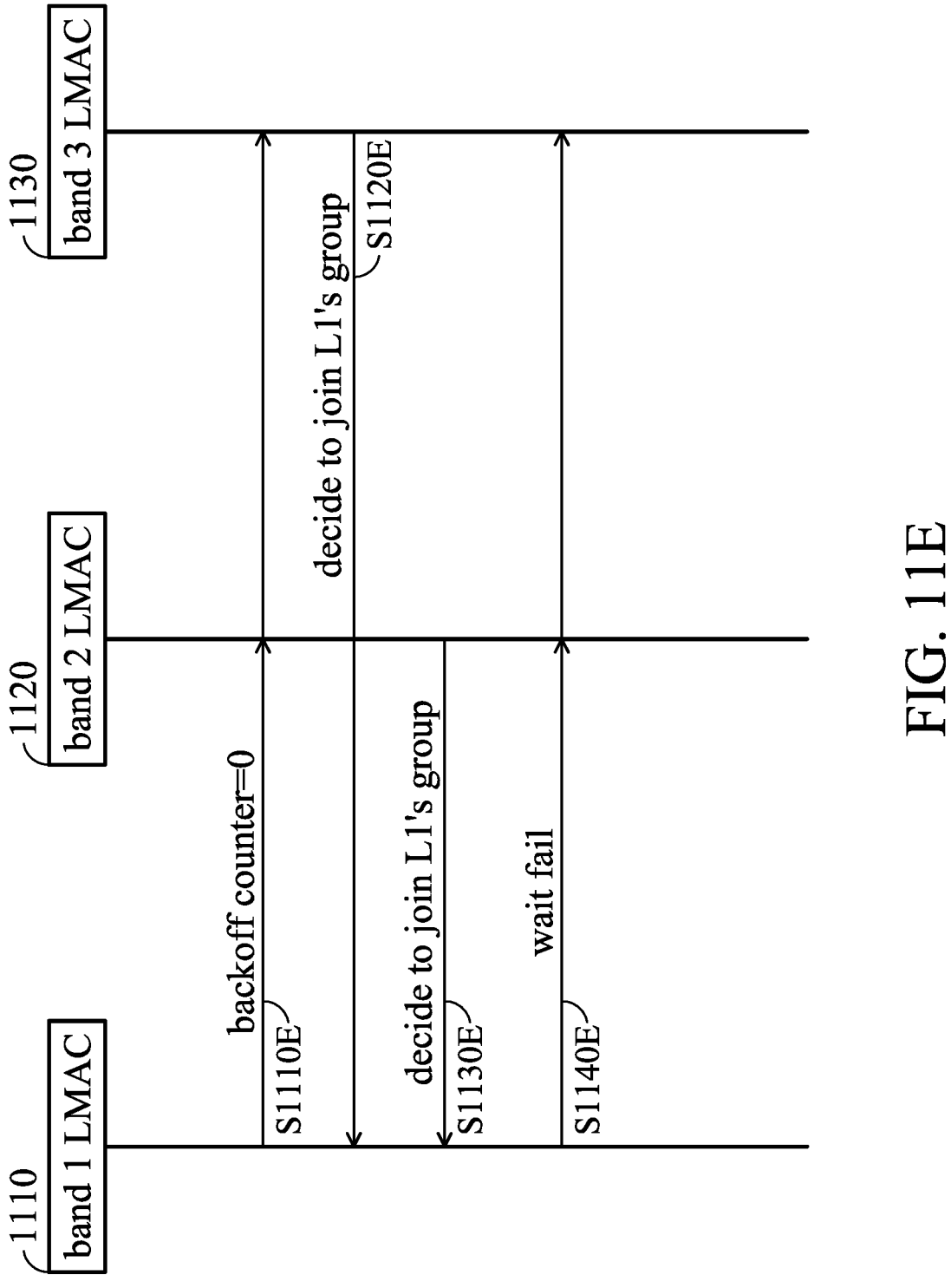
FIG. 11E is a flow chart illustrating a process for synchronous TX based on the distributed architecture according to another embodiment of the invention.

FIG. 11E is a flow chart illustrating a process for synchronous TX start based on the distributed architecture according to another embodiment of the invention. The process may be applied to the Wi-Fi chip 900 of FIG. 9. As shown in FIG. 11E, in step S1110E, the LMAC module 1110 for band 1 (or link 1) may notify the LMAC module 1120 for band 2 and the LMAC module 1130 for band 3 that its backoff counter has reached 0 (i.e., backoff counter=0).

In step S1120E, the LMAC module 1130 for band 3 may decide to join the waiting group of the LMAC module 1110 for band 1 (i.e., L1 's group).

In step S1130E, the LMAC module 1120 for band 2 may decide to join the waiting group of the LMAC module 1110 for band 1 (i.e., L1's group).

In step S1140E, the LMAC module 1110 for band 1 may notify the LMAC module 1120 for band 2 and the LMAC module 1130 for band 3 that a wait fail occurs in the link corresponding to the LMAC module 1110 while the LMAC module 1110 is waiting for the LMAC module 1120 and the LMAC module 1130 (e.g., the link corresponding to the LMAC module 1110 failed while the LMAC module 1110 was waiting for the LMAC module 1120 and the LMAC module 1130). Therefore, the LMAC module 1120 and the LMAC module 1130 may leave the waiting group of LMAC module 1110.

Figure 11F:
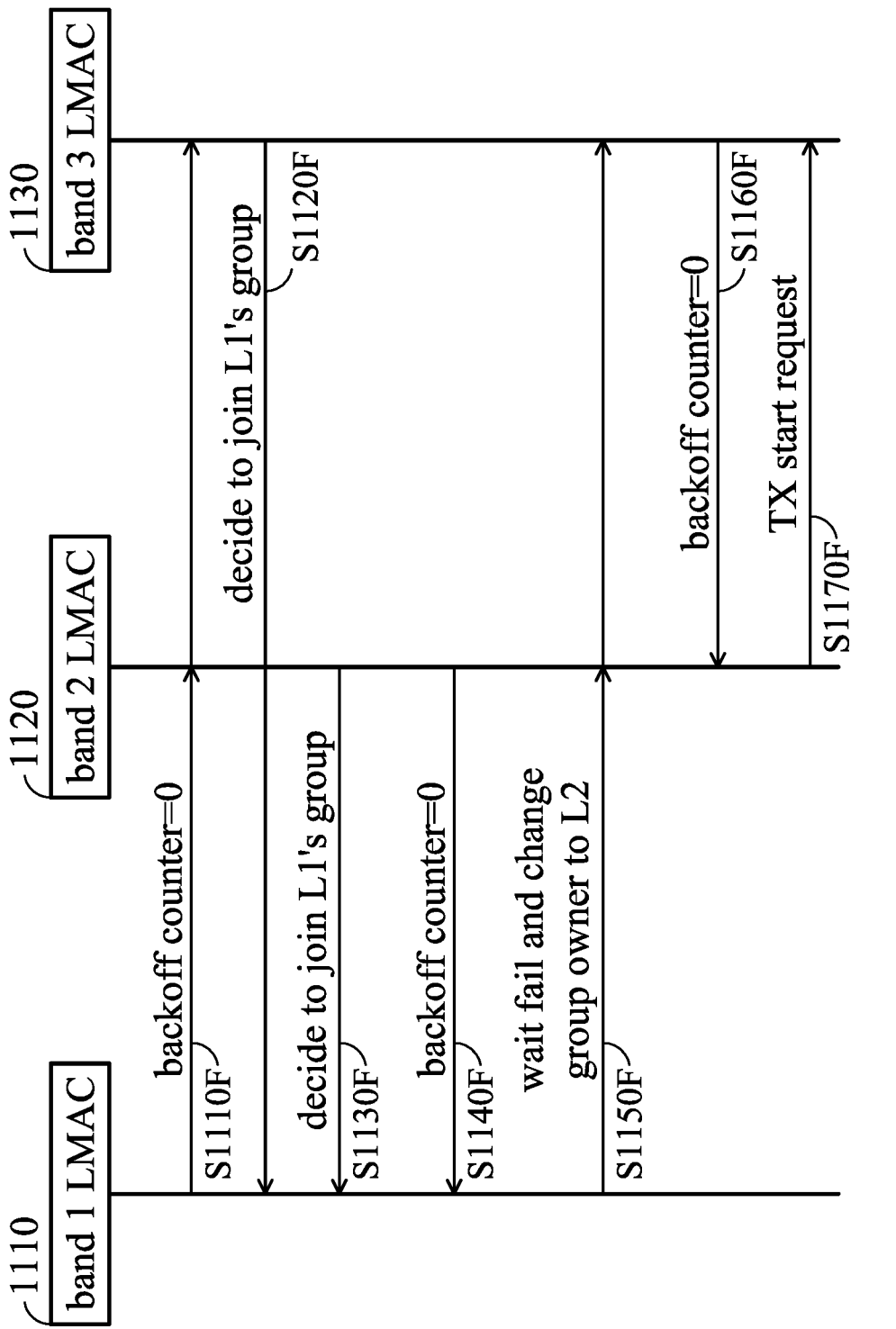
FIG. 11F is a flow chart illustrating a process for synchronous TX start based on the distributed architecture according to another embodiment of the invention.

FIG. 11F is a flow chart illustrating a process for synchronous TX start based on the distributed architecture according to another embodiment of the invention. The process may be applied to the Wi-Fi chip 900 of FIG. 9. As shown in FIG. 11F, in step S1110F, the LMAC module 1110 for band 1 (or link 1) may notify the LMAC module 1120 for band 2 and the LMAC module 1130 for band 3 that its backoff counter has reached 0 (i.e., backoff counter=0).

In step S1120F, the LMAC module 1130 for band 3 may decide to join the waiting group of the LMAC module 1110 for band 1 (i.e., L1 's group).

In step S1130F, the LMAC module 1120 for band 2 may decide to join the waiting group of the LMAC module 1110 for band 1 (i.e., L1's group).

In step S1140F, the LMAC module 1120 for band 2 may notify the LMAC module 1110 for band 1 that the backoff counter of the LMAC module 1120 has reached 0. In addition, the LMAC module 1110 for band 1 may keep waiting for LMAC module 1130 for band 3.

In step S1150F, the LMAC module 1110 for band 1 may notify the LMAC module 1120 for band 2 and the LMAC module 1130 for band 3 that a wait fail occurs in the link corresponding to the LMAC module 1110 while the LMAC module 1110 is waiting for the LMAC module 1130. In addition, in step S1150F, the LMAC module 1110 for band 1 may change the group owner of the waiting group from the LMAC module 1110 to LMAC module 1120.

In step S1160F, the LMAC module 1130 for band 3 may notify the LMAC module 1120 for band 2 that the backoff counter of the LMAC module 1130 has reached 0.

In step S1170F, the LMAC module 1120 for band 2 may transmit a TX start request to the LMAC module 1130 for band 3 to start the synchronous TX for the LMAC module 1120 and the LMAC module 1130.

Figure 12:
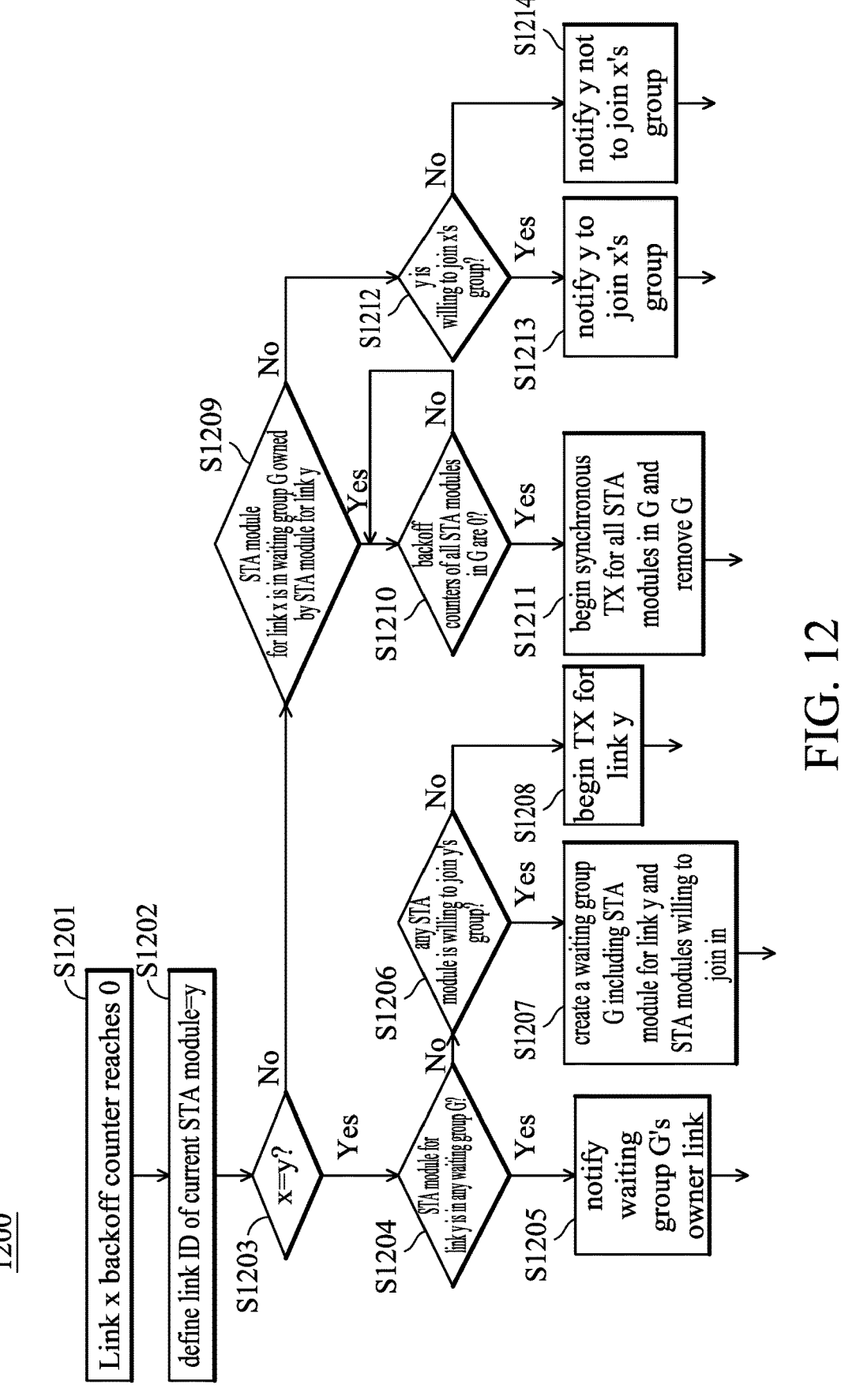
FIG. 12 is a flow chart illustrating an MLO transmission method based on the distributed architecture according to an embodiment of the invention.

FIG. 12 is a flow chart illustrating an MLO transmission method based on the distributed architecture according to an embodiment of the invention. The MLO transmission method 1200 can be applied to the Wi-Fi chip 900 of FIG. 9. As shown in FIG. 12, in step S1201, the backoff counter corresponding to the STA module for link x reaches 0.

In step S1202, the link ID of an STA module that is operating the flow currently may be defined as y (i.e., link y).

In step S1203, the STA module for link y may determine whether the link x is the same as the link y, i.e., determine whether the STA module for link x can regarded as the STA module for link y.

If the link x is the same as the link y, step S1204 is performed. In step S1204, the STA module for link y may determine whether the STA module for link y is in any waiting group G.

If the STA module for link y is in the waiting group G, step S1205 is performed. In step S1205, the STA module for link y may notify the group owner of the waiting group G that the backoff counter corresponding to the STA module for link y has reached 0.

If the STA module for link y is not in any waiting group G, step S1206 is performed. In step S1206, the STA module for link y may determine whether any STA module for another link is willing to join the waiting group G corresponding to the STA module for link y.

If there is at least one STA module for another link willing to join the waiting group G corresponding to the STA module for link y, step S1207 is performed. In step S 1207, the STA module for link y may create the waiting group G comprising the STA module for link y and the STA modules for other links willing to join the waiting group G corresponding to the STA module for link y.

If there is no STA module for another link willing to join the waiting group G corresponding to the STA module for link y, step S1208 is performed. In step S1208, the STA module for link y may determine to begin the single link TX in link y.

If the link x is not the same as the link y, step S1209 is performed. In step S1209, the STA module for link y may determine whether the STA module for link x is in the waiting group G owned by the STA module for link y (i.e., the group owner of the waiting group G is the STA module for link y).

If the STA module for link x is in the waiting group G owned by the STA module for link y, step S1210 is performed. In step S1210, the STA module for link y may determine whether the backoff counters of all STA modules in the waiting group G owned by the STA module for link y reach 0.

If the backoff counters of all STA modules in the waiting group G owned by the STA module for link y reach 0, step S1211 is performed. In step S1211, the STA module for link y may determine to begin the synchronous TX for all STA modules in the waiting group G owned by the STA module for link y. That is, the STA module for link y may transmit the TX start requests to all STA modules in the waiting group G owned by the STA module for link y. After the synchronous TX for all STA modules in the waiting group G owned by the STA module for link y have begun, the STA module for link y may remove the waiting group G owned by the STA module for link y.

If the STA module for link x is not in the waiting group G owned by the STA module for link y, step S1212 is performed. In step S1212, the STA module for link y may determine whether to join the waiting group G owned by the STA module for link x (i.e., the group owner of the waiting group G is the STA module for link x).

If the STA module for link y determines to join the waiting group G owned by the STA module for link x, step S1213 is performed. In step S1213, the STA module for link y may notify the STA module for link x that the STA module for link y decides to join the waiting group G owned by the STA module for link x.

If the STA module for link y determines not to join the waiting group G owned by the STA module for link x, step S1214 is performed. In step S1214, the STA module for link y may notify the STA module for link x that the STA module for link y has decided not to join the waiting group G owned by the STA module for link x.

Figure 13:
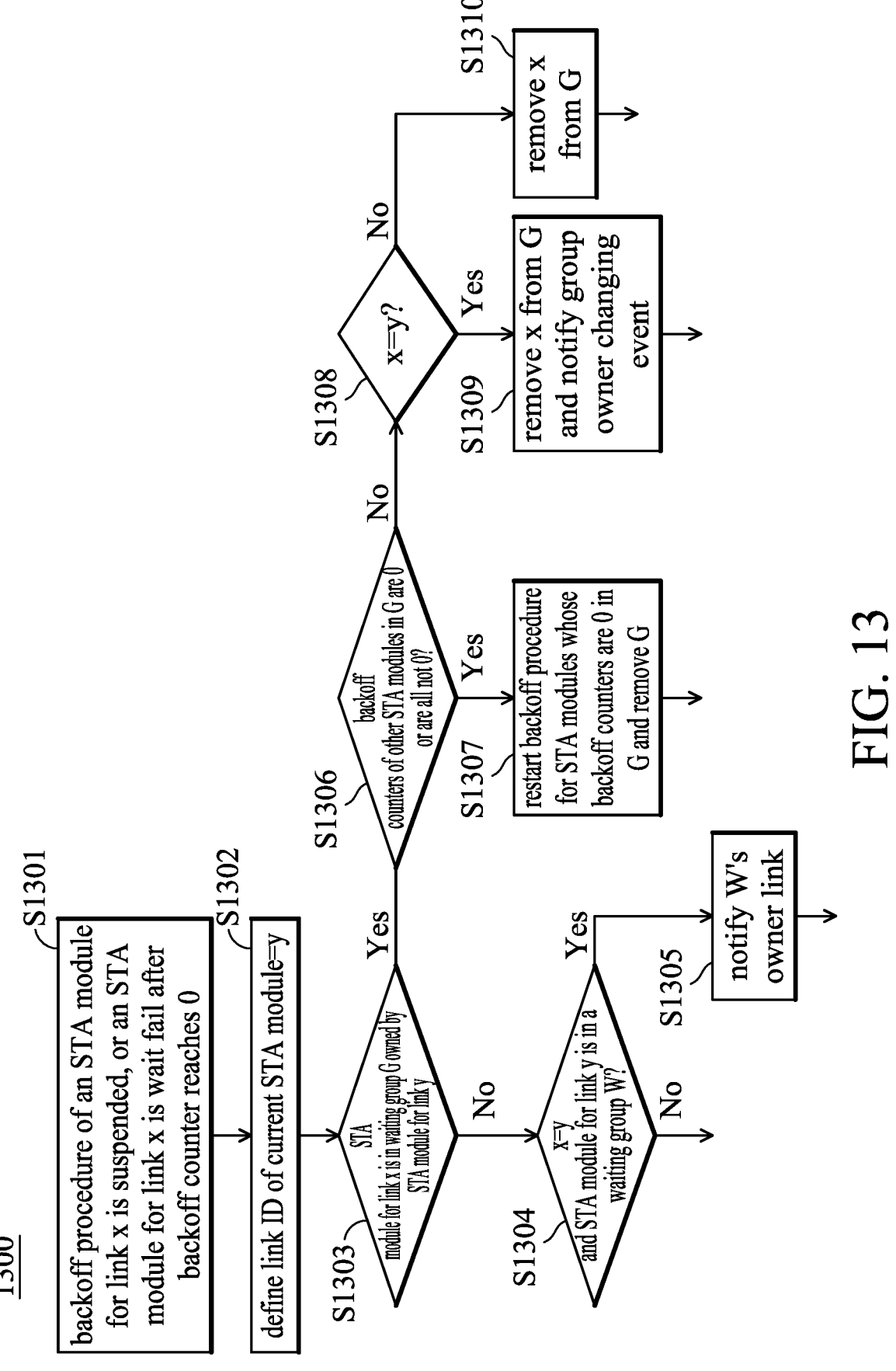
FIG. 13 is a flow chart illustrating an MLO transmission method based on the distributed architecture according to another embodiment of the invention.

FIG. 13 is a flow chart illustrating an MLO transmission method based on the distributed architecture according to another embodiment of the invention. The MLO transmission method 1300 can be applied to the Wi-Fi chip 900 of FIG. 9. As shown in FIG. 13, in step S1301, the backoff procedure of an STA module for link x is suspended (e.g., the medium of the STA module becomes busy), or a wait fail occurs in the STA module for link x after the backoff counter corresponding to the STA module for link x reaches 0.

In step S1302, the link ID of an STA module that is operating the flow may be defined as y (i.e., link y).

In step S1303, the STA module for link y may determine whether the STA module for link x is in the waiting group G owned by the STA module for link y (i.e., the group owner of the waiting group G is the STA module for link y).

If the STA module for link x is not in the waiting group G owned by the STA module for link y, step S1304 is performed. In step S1304, the STA module for link y may determine whether the link x is the same as the link y and whether the STA module for link y is in another waiting group W.

If the link x is the same as the link y (i.e., x=y) and y is in another waiting group W (i.e., the STA module for link y is in the waiting group W, but the group owner of the waiting group W is not the STA module for link y), step S1305 is performed. In step S1305, the STA module for link y may notify the group owner of the waiting group W that the STA module for link y is suspended (e.g., the medium of the STA module becomes busy).

If the STA module for link x is in the waiting group G owned by the STA module for link y, step S1306 is performed. In step S1306, the STA module for link y may determine whether the backoff counters of the other STA modules (except for the STA module for link x) in the waiting group G owned by the STA module for link y all reach 0, or all does not reach 0.

If the backoff counters of the other STA modules in the waiting group G owned by the STA module for link y all reach 0, or all does not reach 0, step S1307 is performed. In step S1307, the STA module for link y may indicate other STA modules whose backoff counters have reached 0 in the waiting group G to restart its backoff procedure. Then, the STA module for link y may remove the waiting group G. In addition, when the backoff counter of all other STA modules in the waiting group G does not reach 0, the backoff procedure of these STA modules will not be suspended.

If the backoff counters of some STA modules (except for the STA module for link x) in the waiting group G owned by the STA module for link y reach 0 and the backoff counters of some STA modules in the waiting group G owned by the STA module for link y does not reach 0, step S1308 is performed. In step S1308, the STA module for link y may determine whether the STA module for link x is the same as the STA module for link y.

If the STA module for link x is the same as the STA module for link y, step S1309 is performed. In step S1309, the STA module for link y may remove the STA module for link x from the waiting group G and notify other STA modules in the waiting group G that the group owner of the waiting group G will be changed (i.e., notify these STA modules of the group owner changed event).

If the STA module for link x is not the same as the STA module for link y, step S1310 is performed. In step S1310, the STA module for link y may remove the STA module for link x from the waiting group G. In addition, the STA module for link y may wait the STA modules whose backoff counters have not reached 0.

FIG. 14 is a flow chart illustrating an MLO transmission method according to an embodiment of the invention. The packet transmission method 1400 can be applied to the wireless communication system 100. As shown in FIG. 14, in step S1410, a plurality of station (STA) modules of the communication apparatus 120 of the wireless communication system 100 may each perform a respective backoff procedure, wherein each STA module may correspond to a different link.

In step S1420, an MLO control circuit of the communication apparatus 120 of the wireless communication system 100 or a first STA module of the STA modules may determine whether to perform a synchronous transmission (TX)

for the first STA module and at least one of the other STA modules in response to a first backoff counter of the first STA module reaching 0.

According to some embodiments of the invention, in the MLO transmission method, the MLO control circuit may further determine to wait for a second STA module of the plurality of STA modules base on a waiting group in response to the first backoff counter of the first STA module reaching 0, wherein the waiting group comprises the first STA module and the second STA module. Then, the MLO control circuit may further determine to perform the synchronous TX for the first STA module and the second STA module in response to a second backoff counter of the second STA module also reaching 0.

According to some embodiments of the invention, in the MLO transmission method, the MLO control circuit may further determine to wait for a second STA module of the plurality of STA modules based on a waiting group in response to the first backoff counter of the first STA module reaching 0, wherein the waiting group comprises the first STA module and the second STA module. Then, the MLO control circuit may further indicate the first STA module to restart the backoff procedure in response to the backoff procedure of the second STA module having been suspended.

According to some embodiments of the invention, in the MLO transmission method, the MLO control circuit may further determine to wait for a second STA module of the plurality of STA modules based on a waiting group in response to the first backoff counter of the first STA module reaching 0, wherein the waiting group comprises the first STA module and the second STA module. Then, the MLO control circuit may further determine not to wait for the second STA module to perform the synchronous TX with the first STA module in response to a first link corresponding to the first STA module having failed while waiting for the second STA module.

According to some embodiments of the invention, in the MLO transmission method, the first STA module may further determine to wait for a second STA module of the plurality of STA modules in response to the second STA module deciding to join a waiting group of the first STA module after the first backoff counter of the first STA module reaches 0. Then, the first STA module may further determine to perform the synchronous TX for all of the STA modules in the waiting group in response to all backoff counters of the STA modules in the waiting group reaching 0.

According to some embodiments of the invention, in the MLO transmission method, the first STA module may further determine to wait for a second STA module of the plurality of STA modules in response to the second STA module deciding to join a waiting group of the first STA module after the first backoff counter of the first STA module reaches 0. Then, the first STA module may further determine to restart the backoff procedures of the STA modules whose backoff counters have reached 0 in the waiting group in response to the backoff procedure of the second STA module having been suspended.

According to some embodiments of the invention, in the MLO transmission method, the first STA module may further determine to wait for a second STA module of the plurality of STA modules in response to the second STA module deciding to join a waiting group of the first STA module after the first backoff counter of the first STA module reaches 0. Then, the second STA module may leave from the waiting group in response to a first link corresponding to the first STA module having failed while waiting for the second STA module, and the second STA module may keep performing the backoff procedure.

According to some embodiments of the invention, in the MLO transmission method, the first STA module may further determine to wait for a second STA module of the plurality of STA modules in response to the second STA module deciding to join a waiting group of the first STA module after the first backoff counter of the first STA module reaches 0. Then, the first STA module may further determine to change a group owner of the waiting group from the first STA module to the second STA module in response to a first link corresponding to the first STA module having failed and a second backoff counter of the second STA module reaching 0.

According to some embodiments of the invention, in the MLO transmission method, the MLO control circuit or the first STA module may further determine to perform a single link TX for the first STA module in response to other STA modules in the same waiting group being suspended before the first backoff counter of the first STA module reaching 0.

In the MLO transmission method provided in the embodiments of the invention, the MLO transmission can be performed through a centralized architecture or a distributed architecture.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A multi-link operation (MLO) transmission method, applied in an apparatus, comprising:
   performing, by a plurality of station (STA) modules of the apparatus, a respective backoff procedure, wherein each STA module corresponds to a different link; and
   determining, by an MLO control circuit of the apparatus or by a first STA module of the plurality of STA modules, whether to perform a synchronous transmission (TX) for the first STA module and at least one of other STA modules in response to a first backoff counter of the first STA module reaching 0, wherein the determining, by the MLO control circuit, whether to perform the synchronous TX, further comprises:
      determining, by the MLO control circuit, to wait for a second STA module of the plurality of STA modules based on a waiting group in response to the first backoff counter of the first STA module reaching 0, wherein the waiting group comprises the first STA module and the second STA module; and
      determining, by the MLO control circuit, not to wait for the second STA module to perform the synchronous TX with the first STA module in response to a first link corresponding to the first STA module having failed while waiting for the second STA module.

2. The MLO transmission method of claim 1, wherein the determining, by the MLO control circuit, whether to perform the synchronous TX, the method further comprises:
   determining, by the MLO control circuit, to wait for a second STA module of the plurality of STA modules based on a waiting group in response to the first backoff counter of the first STA module reaching 0, wherein the waiting group comprises the first STA module and the second STA module; and
   determining, by the MLO control circuit, to perform the synchronous TX for the first STA module and the second STA module in response to a second backoff counter of the second STA module also reaching 0.

3. The MLO transmission method of claim 1, wherein the determining, by the MLO control circuit, whether to perform the synchronous TX, the method further comprises:
   determining, by the MLO control circuit, to wait for a second STA module of the plurality of STA modules based on a waiting group in response to the first backoff counter of the first STA module reaching 0, wherein the waiting group comprises the first STA module and the second STA module; and indicating, by the MLO control circuit, the first STA module to restart the backoff procedure in response to the backoff procedure of the second STA module has been suspended.

4. The MLO transmission method of claim 1, wherein the determining, by the first STA module, whether to perform the synchronous TX, the method further comprises:

determining, by the first STA module, to wait for a second STA module of the plurality of STA modules in response to the second STA module deciding to join a waiting group of the first STA module after the first backoff counter of the first STA module reaches 0; and determining, by the first STA module, to perform the synchronous TX for all of the STA modules in the waiting group in response to all backoff counters of the STA modules in the waiting group reaching 0.

5. The MLO transmission method of claim 1, wherein the determining, by the first STA module, whether to perform the synchronous TX, the method further comprises:

determining, by the first STA module, to wait for a second STA module of the plurality of STA modules in response to the second STA module deciding to join a waiting group of the first STA module after the first backoff counter of the first STA module reaches 0; and determining, by the first STA module, to restart the backoff procedures of the STA modules whose backoff counters have reached 0 in the waiting group in response to the backoff procedure of the second STA module having been suspended.

6. The MLO transmission method of claim 1, wherein the determining, by the first STA module, whether to perform the synchronous TX, the method further comprises:

determining, by the first STA module, to wait for a second STA module of the plurality of STA modules in response to the second STA module deciding to join a waiting group of the first STA module after the first backoff counter of the first STA module reaches 0;

leaving, by the second STA circuit, from the waiting group in response to a first link corresponding to the first STA module having failed while waiting for the second STA module; and keeping, by the second STA circuit, performing the backoff procedure.

7. The MLO transmission method of claim 1, wherein the determining, by the first STA module, whether to perform the synchronous TX, the method further comprises:

determining, by the first STA module, to wait for a second STA module of the plurality of STA modules in response to the second STA module deciding to join a waiting group of the first STA module after the first backoff counter of the first STA module reaches 0; and determining, by the first STA module, to change a group owner of the waiting group from the first STA module to the second STA module in response to a first link corresponding to the first STA module having failed and a second backoff counter of the second STA module reaching 0.

8. The MLO transmission method of claim 1, further comprising:

determining, by the MLO control circuit or by the first STA module, to perform a single link TX for the first STA module in response to other STA modules in the same waiting group being suspended before the first backoff counter of the first STA module reaching 0.

9. An apparatus for multi-link operation (MLO) transmission, comprising:

a transceiver, configured to perform wireless transmission and reception to and from an access point (AP);

a Wi-Fi chip, comprising a plurality of station (STA) modules and an MLO control circuit, wherein each STA module corresponds to a different link;

a processor, coupled to the transceiver and the Wi-Fi chip, and controlling the Wi-Fi chip to:

perform, via the plurality of STA modules, a respective backoff procedure; and determine, via the MLO control circuit, whether to perform a synchronous transmission (TX) for a first STA module and at least one of other STA modules in response to a first backoff counter of the first STA module reaching 0;

determine, via the MLO control circuit, to wait for a second STA module of the plurality of STA modules based on a waiting group in response to the first backoff counter of the first STA module reaching 0, wherein the waiting group comprises the first STA module and the second STA module; and determine, via the MLO control circuit, not to wait for the second STA module to perform the synchronous TX with the first STA module in response to a first link corresponding to the first STA module having failed while waiting for the second STA module.

10. The apparatus of claim 9, wherein the processor further controls the Wi-Fi chip to:

determine, via the MLO control circuit, to wait for a second STA module of the plurality of STA modules based on a waiting group in response to the first backoff counter of the first STA module reaching 0, wherein the waiting group comprises the first STA module and the second STA module; and determine, via the MLO control circuit, to perform the synchronous TX for the first STA module and the second STA module in response to a second backoff counter of the second STA module also reaching 0.

11. The apparatus of claim 9, wherein the processor further controls the Wi-Fi chip to:

determine, via the MLO control circuit, to wait for a second STA module of the plurality of STA modules based on a waiting group in response to the first backoff counter of the first STA module reaching 0, wherein the waiting group comprises the first STA module and the second STA module; and indicate, via the MLO control circuit, the first STA module to restart the backoff procedure in response to the backoff procedure of the second STA module having been suspended.

12. The apparatus of claim 9, wherein the processor further controls the Wi-Fi chip to:

determine, via the MLO control circuit, to perform a single link TX for the first STA module in response to other STA modules in the same waiting group being suspended before the first backoff counter of the first STA module reaching 0.

13. An apparatus for multi-link operation (MLO) transmission, comprising:

a transceiver, configured to perform wireless transmission and reception to and from an access point (AP);

a Wi-Fi chip, comprising a plurality of station (STA) modules, wherein each STA module corresponds to a different link;

a processor, coupled to the transceiver and the Wi-Fi chip, and controlling the Wi-Fi chip to:

perform, via the plurality of STA modules, a respective backoff procedure; and determine, via a first STA module of the plurality of STA modules, whether to perform a synchronous transmission (TX) for the first STA module and at least one of other STA modules in response to a first backoff counter of the first STA module reaching 0;

determine, via the first STA module, to wait for a second STA module of the plurality of STA modules in response to the second STA module deciding to join a waiting group of the first STA module after the first backoff counter of the first STA module reaches 0;

leave, via the second STA circuit, from the waiting group in response to a first link corresponding to the first STA module is failed while waiting for the second STA module; and keep, via the second STA circuit, performing the backoff procedure.

14. The apparatus of claim 13, wherein the processor further controls the Wi-Fi chip to:

determine, via the first STA module, to wait for a second STA module of the plurality of STA modules in response to the second STA module deciding to join a waiting group of the first STA module after the first backoff counter of the first STA module reaches 0; and determine, via the first STA module, to perform the synchronous TX for all of the STA modules in the waiting group in response to all backoff counters of the STA modules in the waiting group reaching 0.

15. The apparatus of claim 13, wherein the processor further controls the Wi-Fi chip to:

determine, via the first STA module, to wait for a second STA module of the plurality of STA modules in response to the second STA module deciding to join a waiting group of the first STA module after the first backoff counter of the first STA module reaches 0; and determine, via the first STA module, to restart the backoff procedures of the STA modules whose backoff counters have reached 0 in the waiting group in response to the backoff procedure of the second STA module having been suspended.

16. The apparatus of claim 13, wherein the processor further controls the Wi-Fi chip to:

determine, via the first STA module, to wait for a second STA module of the plurality of STA modules in response to the second STA module deciding to join a waiting group of the first STA module after the first backoff counter of the first STA module reaches 0; and determine, via the first STA module, to change a group owner of the waiting group from the first STA module to the second STA module in response to a first link corresponding to the first STA module being failed and a second backoff counter of the second STA module reaching 0.

17. The apparatus of claim 13, wherein the processor further controls the Wi-Fi chip to:

determine, via the first STA module, to perform a single link TX for the first STA module in response to other STA modules in the same waiting group being suspended before the first backoff counter of the first STA module reaching 0.

* * * * *